US011292906B2

(12) United States Patent
Gernandt et al.

(10) Patent No.: US 11,292,906 B2
(45) Date of Patent: Apr. 5, 2022

(54) AQUEOUS SILICONE POLYMER EMULSION

(71) Applicant: BASF SE, Ludwigshafen am Rhein (DE)

(72) Inventors: Andreas Gernandt, Ludwigshafen (DE); Clemens Auschra, Ludwigshafen (DE); Ralf Knischka, Ludwigshafen (DE)

(73) Assignee: BASF SE

( * ) Notice: Subject to any disclaimer, the term of this patent is extended or adjusted under 35 U.S.C. 154(b) by 166 days.

(21) Appl. No.: 16/758,291

(22) PCT Filed: Oct. 16, 2018

(86) PCT No.: PCT/EP2018/078236
§ 371 (c)(1),
(2) Date: Apr. 22, 2020

(87) PCT Pub. No.: WO2019/081277
PCT Pub. Date: May 2, 2019

(65) Prior Publication Data
US 2020/0317906 A1 Oct. 8, 2020

(30) Foreign Application Priority Data
Oct. 23, 2017 (EP) ..................................... 17197789

(51) Int. Cl.
| C08L 53/00 | (2006.01) |
| C08L 83/06 | (2006.01) |
| C09D 153/00 | (2006.01) |
| C09D 183/06 | (2006.01) |
| C08F 2/22 | (2006.01) |
| C08F 2/38 | (2006.01) |
| C08F 220/06 | (2006.01) |
| C08F 220/18 | (2006.01) |
| C08K 5/3432 | (2006.01) |

(52) U.S. Cl.
CPC ................ *C08L 53/00* (2013.01); *C08F 2/22* (2013.01); *C08F 2/38* (2013.01); *C08F 220/06* (2013.01); *C08F 220/1804* (2020.02); *C08K 5/3432* (2013.01); *C08L 83/06* (2013.01); *C09D 153/00* (2013.01); *C09D 183/06* (2013.01); *C08F 2438/01* (2013.01); *C08F 2438/02* (2013.01); *C08F 2438/03* (2013.01); *C08L 2201/52* (2013.01)

(58) Field of Classification Search
CPC ...... C08L 53/00; C08L 2201/52; C08L 83/06; C09D 153/00; C09D 183/06; C08F 220/1804; C08F 2438/01; C08F 2438/02; C08F 2438/03; C08F 2/22; C08F 2/38; C08F 220/06; C08K 5/3432

USPC .......................................................... 524/505
See application file for complete search history.

(56) References Cited

U.S. PATENT DOCUMENTS

| 4,581,429 | A | 4/1986 | Solomon et al. |
| 4,656,226 | A | 4/1987 | Hutchins et al. |
| 5,108,654 | A | 4/1992 | Ragaini |
| 5,563,189 | A | 10/1996 | Hosokawa et al. |
| 5,852,095 | A * | 12/1998 | Yamauchi ................. C08F 2/24 524/460 |
| 8,536,296 | B2 | 9/2013 | Meyers et al. |
| 2008/0312377 | A1 | 12/2008 | Schmidt et al. |
| 2011/0130321 | A1 | 6/2011 | Karagianni et al. |
| 2011/0224356 | A1 | 9/2011 | Schmidt et al. |
| 2017/0247570 | A1* | 8/2017 | Pirrung ................... C08L 33/00 |

FOREIGN PATENT DOCUMENTS

| CN | 102994017 B | 5/2015 |
| EP | 0 722 972 A1 | 7/1996 |
| EP | 0 621 878 B1 | 1/2001 |
| GB | 2 335 190 A | 9/1999 |
| GB | 2 361 235 A | 10/2001 |
| WO | WO 94/11412 A1 | 5/1994 |
| WO | WO 96/30421 A1 | 10/1996 |
| WO | WO 98/01478 A1 | 1/1998 |
| WO | WO 99/05099 A1 | 2/1999 |
| WO | WO 99/31144 A1 | 6/1999 |
| WO | WO 2005/059048 A1 | 6/2005 |
| WO | WO 2007/078819 A2 | 7/2007 |
| WO | WO 2009/103613 A1 | 8/2009 |
| WO | WO 2012/018750 A1 | 2/2012 |
| WO | WO 2016/046195 A1 | 3/2016 |

OTHER PUBLICATIONS

International Search Report dated Dec. 19, 2018 in PCT/EP2018/078236 filed on Oct. 16, 2018.
Extended European Search Report dated Apr. 24, 2018 in Patent Application No. 17197789.5, 3 pages.
International Preliminary Report on Patentability dated Apr. 28, 2020 in PCT/EP2018/078236 filed Oct. 16, 2018, 6 pages.
A. Kotera, et al., "Colloid Chemical Studies of Polystyrene Latices Polymerized without any Surface-Active Agents", Kolloid-Zeitschrift und Zeitschrift für Polymere, vol. 239, Aug. 1970, pp. 677-681.

* cited by examiner

*Primary Examiner* — Kelechi C Egwim
(74) *Attorney, Agent, or Firm* — Faegre Drinker Biddle & Reath LLP

(57) ABSTRACT

Aqueous silicone polymer emulsion The presently claimed invention relates to a composition in form of an emulsion of water incompatible silicone oil comprising droplets of silicone oil dispersed in a continuous aqueous phase. The composition provides better slip and mar resistance, antiblocking properties and optical properties to the coating formulations, printing ink, personal care product compositions, textiles, leather and indirect food contact applications.

32 Claims, No Drawings

AQUEOUS SILICONE POLYMER EMULSION

The presently claimed invention relates to silicone emulsions comprising droplets of silicone oil dispersed in a continuous aqueous phase, which are used as additives in coating formulations, printing ink, personal care products, textiles, leather and indirect food contact applications.

BACKGROUND OF THE INVENTION

Silicone oils having one or more poly(dimethylsilyloxy)-groups (PDMS-groups) in their polymeric chain are extensively used in the coating and ink industry as e.g. levelling agents.

As silicone oils having PDMS groups normally tend to accumulate in the air-solid interface, they lead, depending on their molecular weight, to an improved scratch resistance, anti-blocking behavior, anti-crater performance, slip and mar resistance, water repellency and water resistance of the dried coating.

Films in coating formulations tend to adhere to each other due to e.g. low glass transition temperature binders or rub on each other due to a high coefficient of friction. Silicone additives are added to modify the surface properties of a film and lower the friction between film layers and other surfaces or improve the blocking. Numerous coating applications require a reduction in the coefficient of friction (CoF). For example, in the printing industry, slip allows for faster production speeds, insurance against paper jams and of course, sensory benefits for the end user. CoF is also an indicator of resistance to mechanical damage.

Anti-blocking additives are added to coating formulations to minimize the adhesion between the film layers. Once compounded into a coating formulation, one explanation is that these additives create a micro-rough surface which reduces the adhesion between film layers and reduces the blocking tendency.

Dispersion stability is of immense importance for paints and coating formulations. Paint properties like stability during storage, application properties of liquid paint, stability during exposure, gloss level, opacity and color development etc. are largely related to dispersion stability. Controlling the particle size distribution is relevant during dispersion as it influences both the optical and bulk properties of e.g. pigment dispersions in coating formulations.

Silicone emulsions are well known in the art. However, the incorporation of water incompatible silicone oils having one or more PDMS groups into water based formulations is difficult. The incompatibility of the hydrophobic polymer with the aqueous formulation results into phase separation upon storage which thereby leads to severe cratering of the coating when applied, and to haze after curing of the film. Further, the degree of lubricity or slip provided by silicone polymers which can be correlated to some extent with benefits such as resistance to mechanical damage from abrasive action, is related to molecular weight. High molecular weight silicone oils give greater lubrication than low molecular weight silicone oils.

However, the viscosity of the material increases with molecular weight so that the best lubrication is associated with silicone oils that are difficult to add and disperse in water-borne coatings.

Incorporation of silicone oils into water-borne coatings becomes more challenging if the silicon oil is rich in dimethylsilyloxy(DMS)-groups, more particularly if the silicone oil is a pure polydimethysiloxane (PDMS). Pure PDMS consists of a linear arrangement of dimethylsilyloxy-groups terminated on both ends by trimethylsilyloxy groups or Si-bound hydroxyl groups.

The state of the art provides the following technical solutions for including PDMS rich water incompatible silicone oils, i.e. silicon oil rich in dimethylsilyloxy(DMS)-groups, as additives for water-based systems:

1. It is well known in the art that silicone oil-in-water emulsions use surfactants to stabilize the emulsion, that is to prevent the droplets of silicone oil from coalescing into a continuous oil phase, for example EP 0722972 and U.S. Pat. No. 5,563,189 provide use of non-ionic or ionic surfactants for preparing silicone emulsions. Typically, large amounts of surfactants are needed to prepare a physically stable aqueous emulsion of the silicon, the amount being up to 30 wt.-% of surfactant based on the silicone oil. Such emulsions can be stirred into the water-based systems by applying low shear forces. However, a large amount of surfactant is thereby introduced into the formulation. Although the primary purpose of surfactants is to generate micelles and to provide colloidal stability, their use may cause undesirable characteristics in the final product. For example, they are often difficult to remove from the latex, and if removed, may cause destabilization and enhanced coagulation. Furthermore, the films produced by the latex product have poor weather durability and water resistance as the small surfactant molecules tend to migrate with time resulting in smeary films, haze and fogging phenomena. Particle size distributions can also be broad because of secondary nucleation in the system containing surfactants. Finally, a surfactant released into environment may have serious repercussions.

2. The state of the art also describes the use of initiators such as potassium persulfate, oligomers containing sulfonic acid groups and radical functions which assume the role of surfactant to provide colloidal stability (Kotera A, Furusawa K, Takeda Y (1970), Lolloid Z u Z Polymere 239: 677). For example, U.S. Pat. No. 5,852,095 provides an aqueous silicone emulsion obtained by using sulphonic acid group-containing ethylenically unsaturated monomer as surfactants. They are subsequently incorporated in the polymer molecules. The polymer particles formed are sufficiently stable and will not contain any contaminants that can be desorbed. However, considerable amounts of oligomers may be formed, which results in a low overall yield of solid polymer. There is also a risk that even low amounts of solid contaminants (dust) which are difficult to avoid completely, will act as seed particles. This may result in particle size distribution that is almost impossible to control. The dust problem is a direct consequence of the absence of any surface-active agent during the initial stage of polymerization. Further, low molecular weight polymeric surfactants tend to desorb and migrate in the coatings leading to poorer film properties like water sensitivity.

3. Chemically modifying the PDMS rich silicone oil by introducing polar (and thus water compatible) polymer chains into the poly(dimethylsilyloxy) backbone. This route has a high complexity, as reactive sites, such as Si—H or Si—Cl groups, need to be introduced into the main poly(dimethylsilyloxy) chain, e.g. to the terminus (alpha-omega-silicones, block structures) or along the PDMS chains (comb structures), or combinations of the two. These reactive sites are then used for the chemical attachment of a water compatible, polar polymer, typically a polymer of ethylene oxide and/or propylene oxide repeating units. The chemical attachment is achieved via a condensation using OH-functionalities of the polar polymer, or addition reactions via Pt-catalyzed hydrosilylation using an alpha-olefin functionality of the polar polymer. Thereby the resulting PDMS block or comb copolymers are rendered water-dispersible or water-soluble depending on the weight ratio and polarity of the introduced polar polymers, for example U.S. Pat. No. 8,536,296 provides an aqueous emulsion of silicone polyether produced by combining an SiH terminated silicone polyether copolymer an organopolysiloxane having terminal unsaturated groups, a hydrosilylation and an emulsifier to form an oil phase and then admixing water to oil phase to form emulsion. However, although the resultant copolymers become water-dispersible, this simultaneously leads to a dilution of the surface active PDMS units in the formed polymer. Moreover, the surfactant character of the block or comb copolymer is strongly increased, helping the accumulation at the film-air interface on one side, but adding strongly to the foam and water sensitivity problems as in the case of PDMS emulsions.

4. Mixtures of low molecular weight surfactants and PEG/PPG block copolymers are used in the art to emulsify high molecular weight silicon gum. For example, WO 2012/018750 provides emulsions of silicone gum based on ethylene oxide/propylene oxide block copolymer as an emulsifier. The commercially available products have a high particle size distribution ($Dv_{50}$>1 µm) leading to decrease in gloss as well as increase in haze.

US 2011/130321 discloses emulsions comprising an aqueous outer phase, a liquid organic phase comprising silicon oils and an amphiphilic linear block copolymer comprising a hydrophilic block derived from ethylenically unsaturated monomers such as N-ethyl acrylamide and vinylcaprolactam and a hydrophobic block derived from ethylenically unsaturated monomers such as styrene, alkyl (meth)acrylates and isoprene.

Thus, there is an ongoing need to provide aqueous emulsions of silicone polymers which are water incompatible and are able to overcome the aforementioned disadvantages associated with the use of surfactants and chemical modification for introduction of polar groups into silicone oils; and to provide silicone oil based additives for coating formulations, printing ink, personal care products, textiles and food contact applications which offer good slip and mar resistance, anti-blocking properties and optical properties such as high gloss and lower haze.

Therefore, it was an object of the presently claimed invention to emulsify water incompatible silicone oil to provide aqueous emulsions of silicone polymers with controlled particle size distribution, produced without requiring addition of an additional low molecular weight surfactant, which provide better slip and mar resistance, anti-blocking properties and optical properties to the water-based paints, coating formulations, personal care products, textiles, leather and indirect food contact applications.

SUMMARY OF THE INVENTION

Surprisingly, it has been found that a composition in the form of an aqueous emulsion of water incompatible silicone oil is obtained by dispersing at least one non-polymerizable, non-polar silicon oil having at least one poly(dimethylsilyloxy)-group, and at least one block copolymer comprising a block A derived from at least one unsaturated monomer selected from the group comprising of (meth)acrylates and a block B derived from at least one unsaturated monomer selected from the group consisting of (meth)acrylic acids obtained in a controlled radical polymerization process, in water, without the requirement of addition of additional surfactants. The inventors surprisingly found that the block copolymers comprising a block A containing (meth)acry-lates and a block B containing (meth)acrylic acid are able to encapsulate water incompatible actives, i.e. silicone oil, in water-based formulations. The composition of the presently claimed invention exhibits narrow particle size distribution, better slip and mar resistance demonstrated by low values of dynamic coefficient of friction (CoF), anti-blocking behavior and optical properties such as high gloss and lower haze.

In the following, specific embodiments of the present invention are described:

1. A composition in form of an emulsion containing a continuous phase and a dispersed phase comprising:
   a) at least one block copolymer comprising a block A derived from at least one unsaturated monomer selected from the group consisting of (meth)acrylates and a block B derived from at least one unsaturated monomer selected from the group consisting of (meth)acrylic acids, obtained in a controlled radical polymerization process,
   b) at least one non-polymerizable, non-polar silicone oil having at least one poly(dimethylsilyloxy)-group, and
   c) water,
   wherein water is the continuous phase and the at least one non-polymerizable, non-polar silicone oil having at least one poly(dimethylsilyloxy)-group is the dispersed phase in the form of emulsion droplets.

2. The composition according to embodiment 1, wherein in the at least one block copolymer, block A is derived from at least one (meth)acrylate monomer and block B is derived from at least one (meth)acrylic acid monomer, in a controlled radical polymerization.

3. The composition according to embodiments 1 or 2, wherein the weight ratio of (meth)acrylate monomer to (meth)acrylic acid monomer is 1:10 to 10:1.

4. The composition according to one or more of embodiments 1 to 3, wherein the (meth)acrylate monomer is selected from the group consisting of esters of (meth)acrylic acid with $C_1$-$C_{30}$ alkanols, $C_1$-$C_{20}$ alkyl phenols, $C_5$-$C_{20}$ cycloalkanols, phenyl-$C_1$-$C_4$ alkanols or phenoxy-$C_1$-$C_4$ alkanols.

5. The composition according to one or more of embodiments 1 to 4, wherein the (meth)acrylate monomer is selected from the group consisting of esters of (meth)acrylic acid with $C_1$-$C_6$ alkanols.

6. The composition according to one or more of embodiments 1 to 5, wherein the controlled radical polymerization is selected from nitroxide-mediated controlled polymerization (NMP), atom transfer radical polymerization (ATRP), or reversible addition fragmentation chain transfer polymerization (RAFT).

7. The composition according to embodiment 6, wherein the nitroxide-mediated controlled polymerization is carried out by using a polymerization regulator compound which is selected from one of the following formulae (A), (B) and (C) or based on the corresponding stable free nitroxyl radicals in conjunction with a radical source:

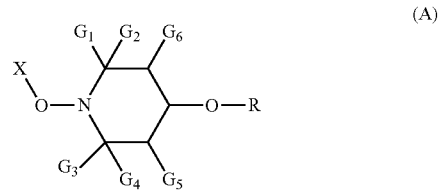

-continued

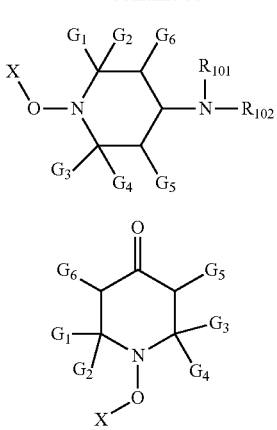

wherein
R is hydrogen, $C_1$-$C_{18}$ alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α, β-unsaturated carboxylic acid having 3 to 5 carbon atoms or of an aromatic carboxylic acid having 7 to 15 carbon atoms;
$R_{101}$ is $C_1$-$C_{12}$ alkyl, $C_5$-$C_7$ cycloalkyl, $C_7$-$C_8$aralkyl, $C_2$-$C_{18}$ alkanoyl, $C_3$-$C_5$ alkenoyl or benzoyl;
$R_{102}$ is $C_1$-$C_{18}$ alkyl, $C_5$-$C_7$ cycloalkyl, $C_2$-$C_8$ alkenyl, which can be unsubstituted or substituted by a cyano, carbonyl or carbamide group, or is glycidyl, a group of the formula —$CH_2CH(OH)$—Z or of the formula —CO—Z or —CONH—Z, wherein Z is hydrogen, methyl or phenyl;
$G_6$ is hydrogen,
$G_5$ is hydrogen or $C_1$-$C_4$ alkyl,
$G_1$ and $G_3$ are methyl
$G_2$ and $G_4$ are ethyl or propyl, or $G_1$ and $G_2$ are methyl and $G_3$ and $G_4$ are ethyl or propyl; and
X is selected from $CH_2$-phenyl, $CH_3CH$-phenyl, $(CH_3)_2$ C-phenyl, $(C_5$-$C_6$ cycloalkyl$)_2$CCN, $(CH_3)_2$ CCN,

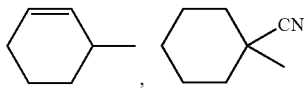

$CH_2CH$=$CH_2$, $CH_3CH$—CH=$CH_2$, $(C_1$-$C_4$alkyl)$CR_{20}$—C(O)-phenyl, $(C_1$-$C_4)$alkyl-$CR_{20}$—C(O)—$(C_1$-$C_4)$alkoxy, $(C_1$-$C_4)$alkyl-$CR_{20}$—C(O)—$(C_1$-$C_4)$alkyl, $(C_1$-$C_4)$alkyl-$CR_{20}$—C(O)—N-di$(C_1$-$C_4)$alkyl, $(C_1$-$C_4)$alkyl-$CR_{20}$—C(O)—NH$(C_1$-$C_4)$alkyl, $(C_1$-$C_4)$alkyl-$CR_{20}$—C(O)—$NH_2$,
wherein $R_{20}$ is hydrogen or $(C_1$-$C_4$ alkyl); and wherein any of the alkyl groups can be unsubstituted or substituted by one or more functional groups selected from the group consisting of hydroxyl, amino, carboxylic acid, halide, cyano, and carbonyl.
8. The composition according to one or more of embodiments 1 to 7, wherein the at least one non-polymerizable, non-polar silicone oil having at least one poly(dimethylsilyloxy)-group has a viscosity in the range from ≥0.1 $m^2$/sec to ≤30000 $m^2$/sec at a temperature of 20° C., according to DIN 53019.
9. The composition according to one or more of embodiments 1 to 8, wherein the at least one non-polymerizable, non-polar silicone oil having at least one poly(dimethylsilyloxy)-group has a viscosity in the range from ≥1000 $m^2$/sec to ≤30000 $m^2$/sec at a temperature of 20° C., according to DIN 53019.
10. The composition according to one or more of embodiments 1 to 9, wherein the at least one non-polymerizable, non-polar silicone oil having at least one poly(dimethylsilyloxy)-group is a polydimethylsiloxane containing at least 90% by weight of dimethylsilyloxy groups, based on total weight of the non-polymerizable, non-polar silicone oil.
11. The composition according to one or more of embodiments 1 to 10, wherein the emulsion droplets have an average size $Dv_{50}$ in the range from ≥10 nm to ≤10000 nm determined according to dynamic light scattering technique with a fixed scattering angle of 90° or 180°.
12. The composition according to one or more of embodiments 1 to 11, wherein the emulsion comprises a micelle having an average size $Dv_{50}$ in the range from ≥10 nm to ≤100 nm determined according to dynamic light scattering technique with a fixed scattering angle of 90° or 180°.
13. The composition according to one or more of embodiments 1 to 12, wherein the at least one block copolymer has a polydispersity index (PDI) in the range from ≥1.1 to ≤1.8 determined according to gel permeation chromatography with polystyrene standards.
14. The composition according to one or more of embodiments 1 to 13, wherein the composition comprises:
a) at least one block copolymer comprising a block A derived from at least one unsaturated monomer selected from the group consisting of esters of (meth)acrylic acid with $C_1$-$C_{30}$ alkanols, $C_1$-$C_{20}$ alkyl phenols, $C_5$-$C_{20}$ cycloalkanols, phenyl-$C_1$-$C_4$ alkanols or phenoxy-$C_1$-$C_4$ alkanols and a block B derived from at least one unsaturated monomer selected from the group consisting of (meth)acrylic acids, obtained in a controlled radical polymerization process,
b) at least one non-polymerizable, non-polar silicone oil having at least one poly(dimethylsilyloxy)-group having a viscosity in the range from ≥0.1 $m^2$/sec to ≤30000 $m^2$/sec, at a temperature of 20° C., according to DIN 53019, and
c) water,
wherein water is the continuous phase and the at least one non-polymerizable, non-polar silicone oil having at least one poly(dimethylsilyloxy)-group is the dispersed phase in the form of emulsion droplets having an average size $Dv_{50}$ in the range from ≥10 nm to ≤10000 nm determined according to dynamic light scattering technique with a fixed scattering angle of 90° or 180°.
15. The composition according to one or more of embodiments 1 to 14, in which,
the amount of the at least one block copolymer is in the range from ≤0.1 wt.-% to ≤10 wt.-% by weight, based upon the total weight of the composition,
the amount of the at least one non-polymerizable, non-polar silicone oil having at least one poly(dimethylsilyloxy)-group is in the range from ≥0.1 wt.-% to ≤70 wt.-% by weight, based upon the total weight of the composition, and the amount of water is in the range from ≥20 wt.-% to ≤98.8 wt.-% by weight, based upon the total weight of the composition.

16. The composition according to one or more of embodiments 1 to 15, wherein the composition comprises:
   a) ≥0.1 wt.-% to ≤10 wt.-% by weight of at least one block copolymer comprising a block A derived from at least one unsaturated monomer selected from the group consisting of esters of (meth)acrylic acid with $C_1$-$C_{30}$ alkanols and a block B derived from (meth)acrylic acid, obtained in a controlled radical polymerization process,
   b) ≥0.1 wt.-% to ≤70 wt.-% by weight of at least one non-polymerizable, non-polar silicone oil having at least one poly(dimethylsilyloxy)-group having a viscosity in the range from ≥1000 $m^2$/sec to ≤30000 $m^2$/sec, at a temperature of 20° C., according to DIN 53019, and
   c) ≥20 wt.-% to ≤98.8 wt.-% by weight water,
   wherein the wt.-% are based upon total weight of the composition, and wherein water is the continuous phase and the at least one non-polymerizable, non-polar silicone oil having at least one poly(dimethylsilyloxy)-group is the dispersed phase in the form of emulsion droplets having an average size $Dv_{50}$ in the range from ≥10 nm to ≤10000 nm determined according to dynamic light scattering technique with a fixed scattering angle of 90° or 180°.

17. The composition according to one or more of embodiments 1 to 16, wherein the composition comprises:
   a) ≥0.1 wt.-% to ≤10 wt.-% by weight of at least one block copolymer comprising a block A derived from at least one unsaturated monomer selected from the group consisting of esters of (meth)acrylic acid with $C_1$-$C_6$ alkanols and a block B derived from at least one unsaturated monomer selected from the group consisting of (meth)acrylic acids, obtained in a controlled radical polymerization,
   b) ≥0.1 wt.-% to ≤70 wt.-% by weight of at least one non-polymerizable, non-polar silicone oil having at least one poly(dimethylsilyloxy)-group having a viscosity in the range from ≥1000 $m^2$/sec to ≤30000 $m^2$/sec, at a temperature of 20° C., according to DIN 53019, and
   c) ≥20 wt.-% to ≤98.8 wt.-% by weight water,
   wherein the wt.-% are based upon total weight of the composition, and
   wherein water is the continuous phase and the at least one non-polymerizable, non-polar silicone oil having at least one poly(dimethylsilyloxy)-group is the dispersed phase, whereby the at least one non-polymerizable, non-polar silicone oil having at least one poly(dimethylsilyloxy)-group contains at least 90% by weight of dimethylsilyloxy groups, based on total weight of the non-polymerizable, non-polar silicone oil, is in the form of emulsion droplets having an average size $Dv_{50}$ in the range from ≥10 nm to ≤10000 nm determined according to dynamic light scattering technique with a fixed scattering angle of 90° or 180°.

18. The composition according to one or more of embodiments 1 to 17, wherein the composition comprises:
   a) ≥0.1 wt.-% to ≤10 wt.-% by weight of at least one block copolymer comprising a block A derived from n-butyl acrylate and a block B derived from (meth)acrylic acid, obtained in a controlled radical polymerization process,
   b) ≥0.1 wt.-% to ≤70 wt.-% by weight of at least one non-polymerizable, non-polar silicone oil having at least one poly(dimethylsilyloxy)-group having a viscosity in the range from ≥1000 $m^2$/sec to ≤30000 $m^2$/sec, at a temperature of 20° C., according to DIN 53019, and
   c) ≥20 wt.-% to ≤98.8 wt.-% by weight water,
   wherein the wt.-% are based upon total weight of the composition, and
   wherein water is the continuous phase and the at least one non-polymerizable, non-polar silicone oil having at least one poly(dimethylsilyloxy)-group is the dispersed phase, whereby the at least one non-polymerizable, non-polar silicone oil having at least one poly(dimethylsilyloxy)-group contains at least 90% by weight of dimethylsilyloxy groups, based on total weight of the non-polymerizable, non-polar silicone oil, is in the form of emulsion droplets having an average size $Dv_{50}$ in the range from ≥10 nm to ≤10000 nm determined according to dynamic light scattering technique with a fixed scattering angle of 90° or 180°.

19. The composition according to one or more of embodiments 1 to 18, in which the weight ratio of the at least one non-polymerizable non-polar silicone oil having at least one poly(dimethylsilyloxy)-group to the at least one block copolymer is in the range from ≥1:100 to ≤100:1.

20. The composition according to one or more of embodiments 1 to 19, in which the weight ratio of the at least one non-polymerizable non-polar silicone oil having at least one poly(dimethylsilyloxy)-group to the at least one block copolymer is in the range from ≥1:20 to ≤20:1.

21. The composition according to one or more of embodiments 1 to 20, in which the solid content in the emulsion is in the range from ≥10% to ≤75%.

22. A process for preparing the composition according to one or more of embodiments 1 to 21, comprising the steps of—
   i) preparing a block copolymer solution by controlled radical polymerization by reacting at least one unsaturated monomer selected from the group consisting of (meth)acrylates and reacting (meth)acrylic acid;
   ii) mixing the block copolymer solution obtained in step i) in water and adding non-polymerizable, non-polar silicone oil having at least one poly(dimethylsilyloxy)-group to obtain a pre-emulsion; and
   iii) homogenizing the pre-emulsion obtained in step ii) to obtain the composition in form of an emulsion having emulsion droplets of an average size $Dv_{50}$ in the range from ≥100 nm to ≤10000 nm determined according to dynamic light scattering technique with a fixed scattering angle of 90° or 180°.

23. The process according to embodiment 22, comprising a step of neutralizing the block copolymer solution of step i) by reacting with a compound selected from the group consisting of an alkyl alkanolamine, alkali metal hydroxide, alkali metal carbonate, alkali metal hydrogen carbonate and ammonia.

24. The process according to embodiment 22 or 23, comprising adding a solvent to dissolve silicone oil to obtain a silicon solution.

25. The process according to embodiment 24, comprising removing the solvent.

26. The process according to embodiment 24 or 25, wherein the solvent is selected from the group consisting of toluene, xylene, hexamethyldisiloxane, D4, naptha, cyclohexane, n-hexane, n-heptane, diisopropyl ether, hexyl ether, ethyl acetate, butyl acetate, isopropyl laurate, isopropyl palmitate, isopropyl myristate, methyl ethyl ketone, methyl isobutyl ketone, lauryl alcohol, trichloroethylene, perchloroethylene and methylene chloride.

27. The process according to embodiment 26, wherein the solvent is selected from the group consisting of toluene, xylene, and hexamethyldisiloxane.
28. Use of the composition according to one of more of embodiments 1 to 21 as an additive in polymer based aqueous coating compositions, printing ink compositions, personal care products, textiles, leather and indirect food contact applications.
29. The use according to embodiment 28, wherein the use provides at least one of the following effects:
    reduction of the static or dynamic coefficient of friction of the coating or ink,
    increasing the anti-blocking properties of the coating, ink or in food contact applications,
    increasing stain resistance of the coating or ink,
    imparting anti-graffiti properties to the coating or ink,
    imparting hydrophobic properties or water repellence to the coating or ink,
    smoothening effect in personal care products, and finishing effect in textiles and leather.
30. An aqueous composition in the form of a coating composition or printing ink composition or personal care product composition having, ≥0.01% wt.- to ≤10% wt.-by weight, based on the total weight of the aqueous composition, composition in form of emulsion according to one or more of embodiments 1 to 21 or a composition prepared according to one or more of embodiments 22 to 27; and additionally, pigments, fillers, binders, solvents, defoamers, pigment dispersing agents, rheology modifiers, wetting agents, neutralizers, organically modified polysiloxanes, UV absorbers, matting agents, pigment, synergists and preservatives, whereby the sum of the weight percentages of the components adds up to 100% by weight.
31. An aqueous composition in the form of a coating composition or printing ink composition or personal care product composition, having ≥0.1% wt.- to ≤5% wt.-% by weight, based on the total weight of the aqueous composition, composition in form of emulsion according to one or more of embodiments 1 to 21 or a composition prepared according to one or more of embodiments 22 to 27; and additionally pigments, fillers, binders, solvents, defoamers, pigment dispersing agents, rheology modifiers, wetting agents, neutralizers, organically modified polysiloxanes, UV absorbers, matting agents, pigment, synergists and preservatives, whereby the sum of weight percentages of components adds up to 100% by weight.
32. An aqueous composition in the form of a coating composition or printing ink composition or personal care product composition, having ≥0.1% wt.- to ≤3% wt.-by weight, based on the total weight of the aqueous composition, composition in form of emulsion according to one or more of embodiments 1 to 21 or a composition prepared according to one or more of embodiments 22 to 27; and additionally, pigments, fillers, binders, solvents, defoamers, pigment dispersing agents, rheology modifiers, wetting agents, neutralizers, organically modified polysiloxanes, UV absorbers, matting agents, pigment, synergists and preservatives, whereby the sum of weight percentages of components adds up to 100% by weight.
33. A composition in form of an emulsion containing a continuous phase and a dispersed phase consisting of:
    a) at least one block copolymer comprising a block A derived from at least one unsaturated monomer selected from the group consisting of (meth)acrylates and a block B derived from at least one unsaturated monomer selected from the group consisting of (meth)acrylic acids, obtained in a controlled radical polymerization process,
    b) at least one non-polymerizable, non-polar silicone oil having at least one poly(dimethylsilyloxy)-group, and
    c) water,
    wherein water is the continuous phase and the at least one non-polymerizable, non-polar silicone oil having at least one poly(dimethylsilyloxy)-group is the dispersed phase in the form of emulsion droplets.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

If hereinafter a group is defined to comprise at least a certain number of embodiments, this is meant to also encompass a group which preferably consists of these embodiments only. Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The presently claimed invention is directed to a composition in the form of an emulsion of water incompatible silicone oil which acts as an effective additive for water-based paints, coating formulations, personal care products, textiles and food contact applications, and offers good slip and mar resistance, anti-blocking properties and optical properties such as high gloss and lower haze to the water based formulations.

The composition is obtained by dispersing at least one non-polymerizable, non-polar silicone oil having at least one poly(dimethylsilyloxy)-group and at least one block copolymer comprising a block A derived from at least one unsaturated monomer selected from the group consisting of (meth)acrylates and a block B derived from at least one unsaturated monomer selected from the group consisting of (meth)acrylic acids, in water, without the requirement of addition of surfactants. Hence, preferably the composition of the presently claimed invention does not contain any additional surfactant. Even though the silicone oil emulsion is neither chemically modified with polar groups nor contains surfactants, these silicone oil-block copolymer particles can be easily incorporated to polar coating systems, without showing the incompatibility problems and other disadvantages known from conventional emulsions of non-polar silicone oils.

An emulsion is defined as a heterogenous liquid system involving two immiscible phases, with one of the phase being intimately dispersed in the form of droplets in the second phase. The matrix of an emulsion is called the external or continuous phase, while the portion of emulsion that is in form of droplet is called the internal, dispersed or discontinuous phase. In particular, in context of the composition of the present invention which is in form of an emulsion, water is the continuous phase and at least one non-polymerizable, non-polar silicone oil having at least one poly(dimethylsilyloxy)-group is the dispersed phase.

The term "unsaturated monomer" used here means that the respective monomer has at least one polymerizable C=C double bond, more particularly one C=C double bond polymerizable under the conditions of a free-radical aqueous emulsion polymerization.

The prefixes $C_n$-$C_m$ used here specify a range for the possible number of carbon atoms in each case that may be present in a radical or molecule thus identified or a compound designated therewith.

Thus, for example, $C_1$-$C_{30}$ alkyl, or $C_1$-$C_{10}$ alkyl or $C_1$—C alkyl, stands for a linear or branched alkyl radical having 1 to 30, or 1 to 10 or 1 to 8, carbon atoms.

Thus, for example, $C_1$-$C_{30}$ alkanol stands for linear or branched aliphatic alcohol having 1 to 30 carbon atoms.

Thus, for example, $C_1$-$C_{20}$ alkyl phenol stands for linear or branched phenol having 1 to 20 carbon atoms.

Thus, for example, $C_5$-$C_{20}$ cycloalkanol stands for a monovalent linear or branched cycloaliphatic alcohol having 5 to 20 carbon atoms such as, for example, cyclopentanol, cyclohexanol, cycloheptanol, cyclooctanol, cyclononanol and cycloeicosanol.

Thus, for example, phenyl-$C_1$-$C_4$ alkanol or phenoxy-$C_1$-$C_4$ alkanol stands for a phenyl- or phenoxy-substituted monovalent alkanol, respectively, the alkanol moiety having 1 to 4 carbon atoms. Examples of phenyl-$C_1$-$C_4$ alkanol are benzyl alcohol, 1-phenylethanol and 2-phenylethanol. An example of phenoxy-$C_1$-$C_4$ alkanol is 2-phenoxyethanol.

Unsaturated $C_3$-$C_6$ monocarboxylic acids stands for a monoethylenically unsaturated monocarboxylic acid having 3 to 6 carbon atoms, such as acrylic acid, methacrylic acid, vinylacetic acid or crotonic acid, for example.

In an embodiment of the presently claimed invention at least one unsaturated monomer is selected from the group consisting of—
  esters of monoethylenically unsaturated $C_3$-$C_6$ monocarboxylic acids with $C_1$-$C_{30}$ alkanols, $C_1$-$C_{20}$-alkyl phenols, $C_5$-$C_{20}$ cycloalkanols, phenyl-$C_1$-$C_4$ alkanols or phenoxy-$C_1$-$C_4$ alkanols, where the phenyl ring in phenyl-$C_1$-$C_4$ alkanols or phenoxy-$C_1$-$C_4$ alkanols may be unsubstituted or substituted by a $C_1$-$C_{20}$-alkyl radical, more preferably the aforementioned esters of acrylic acid and most preferably the aforementioned esters of methacrylic acid;
  diesters of monoethylenically unsaturated $C_4$-$C_6$ dicarboxylic acids with $C_1$-$C_{30}$ alkanols, $C_1$-$C_{20}$-alkyl phenols, $C_5$-$C_{20}$ cycloalkanols, phenyl-$C_1$-$C_4$ alkanols or phenoxy-$C_1$-$C_4$ alkanols, where the phenyl ring in phenyl-$C_1$-$C_4$ alkanols or phenoxy-$C_1$-$C_4$ alkanols may be unsubstituted or substituted by a $C_1$-$C_{20}$-alkyl radical, more preferably the aforementioned esters of maleic acid;
  vinyl aromatic hydrocarbons, such as, for example, styrene, vinyltoluenes, tert-butylstyrene, α-methylstyrene, and the like, more preferably styrene;
  vinyl, allyl, and methallyl esters of saturated aliphatic $C_2$-$C_{24}$ monocarboxylic acids; and
  α-olefins having 2 to 24 carbon atoms, and also conjugated diolefins such as butadiene and isoprene.

In an embodiment of the presently claimed invention at least one unsaturated monomer is selected from the group consisting of esters of monoethylenically unsaturated $C_3$-$C_6$ monocarboxylic acids with $C_1$-$C_{30}$ alkanols, $C_1$-$C_{20}$-alkyl phenols, $C_5$-$C_{20}$ cycloalkanols, phenyl-$C_1$-$C_4$ alkanols or phenoxy-$C_1$-$C_4$ alkanols.

In a preferred embodiment of the presently claimed invention at least one unsaturated monomer is selected from the group consisting of the esters of acrylic acid such as methyl acrylate, ethyl acrylate, n-propyl acrylate, isopropyl acrylate, n-butyl acrylate, 2-butyl acrylate, iso-butyl acrylate, tert-butyl acrylate, n-hexyl acrylate, 2-ethylhexyl acrylate, 3-propylheptyl acrylate, decyl acrylate, lauryl acrylate, stearyl acrylate, cyclohexyl acrylate, benzyl acrylate, 2-phenylethyl acrylate, 1-phenylethyl acrylate, 2-phenoxyethyl acrylate; and also esters of (meth)acrylic acid such as methyl methacrylate, ethyl methacrylate, n-propyl methacrylate, isopropyl methacrylate, n-butyl methacrylate, 2-butyl methacrylate, isobutyl methacrylate, tert-butyl methacrylate, n-hexyl methacrylate, 2-ethylhexyl methacrylate, decyl methacrylate, lauryl methacrylate, stearyl methacrylate, cyclohexyl methacrylate, benzyl methacrylate, 2-phenylethyl methacrylate, 1-phenylethyl methacrylate, and 2-phenoxyethyl methacrylate.

In another embodiment of the presently claimed invention at least one unsaturated monomer is selected from the group consisting of diesters of monoethylenically unsaturated $C_4$-$C_6$ dicarboxylic acids with $C_1$-$C_{30}$ alkanols, $C_1$-$C_{20}$ alkyl phenols, $C_5$-$C_{20}$ cycloalkanols, phenyl-$C_1$-$C_4$ alkanols or phenoxy-$C_1$-$C_4$ alkanols are, in particular, the diesters of maleic acid and the diesters of fumaric acid, more particularly di-$C_1$-$C_2$ alkyl maleinates and di-$C_1$-$C_2$ alkyl fumarates such as dimethyl maleinate, diethyl maleinate, di-n-butyl maleinate, dimethyl fumarate, diethyl fumarate, and di-n-butyl fumarate.

In another embodiment of the presently claimed invention at least one unsaturated monomer is selected from the group consisting of vinyl, allyl, and methallyl esters of saturated aliphatic $C_2$-$C_{24}$ monocarboxylic acids are vinyl acetate, vinyl propionate, vinyl butyrate, vinyl pivalate, vinyl hexanoate, vinyl-2-ethylhexanoate, vinyl laurate, and vinyl stearate, and also the corresponding allyl and methallyl esters.

In yet another embodiment of the presently claimed invention at least one unsaturated monomer is selected from the group consisting of α-olefins having 2 to 24 C atoms are ethylene, propylene, 1-butene, isobutene, 1-pentene, 1-hexene, diisobutene, triisobutene, tetraisobutene and pentaisobutene.

In a preferred embodiment of the presently claimed invention (meth)acrylate monomer is selected from the group consisting of esters of (meth)acrylic acid with $C_1$-$C_3$ alkanols, $C_1$-$C_{20}$ alkyl phenols, $C_5$-$C_{20}$ cycloalkanols, phenyl-$C_1$-$C_4$ alkanols or phenoxy-$C_1$-$C_4$ alkanols.

In a preferred embodiment of the presently claimed invention the (meth)acrylate monomer is selected from the group consisting of esters of (meth)acrylic acid with $C_1$-$C_6$ alkanols.

In an embodiment of the presently claimed invention, in the at least one block copolymer the weight ratio of (meth)acrylate monomer to (meth)acrylic acid monomer is 1:10 to 10:1.

In another embodiment of the presently claimed invention, in the at least one block copolymer the weight ratio of (meth)acrylate monomer to (meth)acrylic acid monomer is in the range from ≥0.1:1 to ≤10:1, preferably in the range from ≥0.5:1 to ≤10:1, more preferably in the range from ≥1:1 to ≤10:1, even more preferably in the range from ≥2:1 to ≤10:1, further more preferably in the range from ≥2:1 to ≤7:1 and most preferably in the range from ≥2:1 to ≤5:1.

In an embodiment of the presently claimed invention the at least one non-polymerizable non-polar silicon oil used for the purpose of the present invention does not have a C=C-double bond. A non-polar silicone oil is usually a silicone oil, which has a solubility in water of not more than 1 g/l, in particular not more than 0.1 g/l, at 20° C.

In another embodiment of the presently claimed invention the at least one non-polymerizable, non-polar silicone oil is a polydimethylsiloxane (PDMS) which contains at least ≥70% by weight, preferably at least ≥80% by weight and most preferably at least 90% by weight of dimethylsilyloxy (DMS) groups, based on the total weight of the non-polymerizable, non-polar silicone oil.

In another embodiment of the presently claimed invention the at least one non-polymerizable, non-polar silicone oil is a liquid at 100° C., in particular at 40° C. and more particularly at 20° C.

Suitable non-polar non-polymerizable silicone oils are e.g. selected from the following polydimethylsiloxanes types:

S1: pure polydimethylsiloxanes, i.e. linear or Si-branched polysiloxanes which essentially consist of dimethylsilyloxy groups and terminal trimethylsilyloxy groups, preferably those with $M_w$ in the range from 800 to 1000000 g/mol, especially from 1000 to 500000 g/mol;

S2: α,θ-terminated polydimethylsiloxanes, i.e. linear or Si-branched polysiloxanes having terminal $C_2$-$C_{30}$-alkyl groups, which are interrupted by at least one functional moiety selected from —O—, —OC=O— or —NHC=O—, or terminal $C_1$-$C_{10}$-alkoxy groups, preferably those with $M_w$ in the range from 800 to 100000 g/mol, especially from 1000 to 50000 g/mol;

S3: Polysiloxanes of the formula

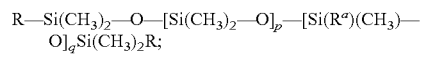

where q is an integer from 1 to 500 and p is and an integer from 0 to 500 with p+q being at least 2, in particular at least 5, e.g. from 2 to 1000, in particular from 5 to 500;

R is $CH_3$, $C_2$-$C_{22}$ alkyl, halogenated $C_1$-$C_{22}$ alkyl, $C_5$-$C_{22}$ cycloalkyl, or an aromatic hydrocarbon radical having 6 to 22 carbon atoms, such as phenyl or phenyl-$C_1$-$C_4$-alkyl, and $R^a$ is $C_2$-$C_{22}$ alkyl, halogenated $C_1$-$C_{22}$ alkyl, $C_5$-$C_{22}$ cycloalkyl, an aromatic hydrocarbon radical having 6 to 22 carbons, such as phenyl or phenyl-$C_1$-$C_4$-alkyl, or —[Si(CH$_3$)$_2$—O]$_n$—[Si(R$^b$)(CH$_3$)—O]$_m$Si(CH$_3$)$_2$R, where n and m are identical or different and an integer from 1 to 100 with n+m being at least 1, R is as defined above and $R^b$ is a radical selected from $C_2$-$C_{22}$ alkyl, halogenated $C_1$-$C_{22}$ alkyl, $C_5$-$C_{22}$ cycloalkyl and an aromatic hydrocarbon radical having 6 to 22 carbons, such as phenyl or phenyl-$C_1$-$C_4$-alkyl.

In the polysiloxanes S3, the moieties —[Si(CH$_3$)$_2$—O]— and —[Si(R$^a$)(CH$_3$)—O]— and, if present, moieties —[Si(CH$_3$)$_2$—O]— and —[Si(R$^b$)(CH$_3$)—O]— may be arranged statistically or blockwise. The polysiloxanes S3 preferably have an $M_w$ in the range from 800 to 500000 g/mol, especially from 1000 to 100000 g/mol.

S4: Polysiloxanes of the formula

R'—Si(CH$_3$)$_2$—O—[Si(CH$_3$)$_2$—O]—[Si(R$^c$)(CH$_3$)—O]$_k$Si(CH$_3$)$_2$R';

where k is an integer from 1 to 500 and j is and an integer from 0 to 500 with j+k being at least 2, in particular at least 5, e.g. from 2 to 1000, in particular from 5 to 500;

R' is $CH_3$, halogenated $C_1$-$C_{22}$ alkyl, or a $C_2$-$C_{30}$-alkyl group, which is interrupted by at least one functional moiety selected from —O—, —OC=O— or —NHC=O—, and $R^c$ is a $C_2$-$C_{30}$-alkyl group, which is interrupted by at least one functional moiety selected from —O—, —OC=O— or —NHC=O—, or

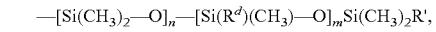

where n and m are identical or different and an integer from 1 to 100 with n+m being at least 1, R' is as defined above and $R^d$ is a $C_2$-$C_{30}$-alkyl group, which is interrupted by at least one functional moiety selected from —O—, —OC=O— or —NHC=O—.

In the polysiloxanes S4, the moieties —[Si(CH$_3$)$_2$—O]— and —[Si(R)(CH$_3$)—O]— and, if present, moieties —[Si(CH$_3$)$_2$—O]— and —[Si(R$^d$)(CH$_3$)—O]— may be arranged statistically or blockwise. The polysiloxanes S4 preferably have an $M_w$ in the range from 800 to 500000 g/mol, especially from 1000 to 100000 g/mol.

The non-polymerizable, non-polar silicone oil can be a blend of the PDMS types S1 to S4 described above, or mixtures of the same type of PDMS within the same group S1 to S4 of with different molecular weights and structures.

In a particular group of embodiments, the non-polymerizable silicone oil is a single type of PDMS. In another particular group of embodiments, the non-polymerizable silicone oil is a mixture of at least two silicone oils having different average molecular weights.

In an embodiment of the presently claimed invention the at least one non-polymerizable, non-polar silicone oil is a silicone having at least one poly(dimethylsilyloxy)-group has a weight average molecular weight $M_w$ in the range from ≥800 to ≤1000000 g/mol, preferably in the range from ≥1500 to ≤800000 g/mol, more preferably in the range from ≥2500 to ≤500000 g/mol. The average number of repeating units of DMS are in the range of ≥10 to ≤10000, preferably in the range from ≥20 to ≤5000 and especially in the range from ≥30 to ≤3000.

In another embodiment of the presently claimed invention the at least one non-polymerizable, non-polar silicone oil having at least one poly(dimethylsilyloxy)-group has a viscosity in the range from ≥0.1 m²/sec to ≤30000 m²/sec at a temperature of 20° C., according to DIN 53019. Preferably, the viscosity is in the range from ≥1 m²/sec to ≤30000 m²/sec, more preferably the viscosity is in the range from ≥5 m²/sec to ≤30000 m²/sec, even more preferably the viscosity is in the range from ≥10 m²/sec to ≤30000 m²/sec, further more preferably the viscosity is in the range from ≥100 m²/sec to ≤30000 m²/sec, most preferably the viscosity is in the range from ≥1000 m²/sec to ≤30000 m²/sec, at a temperature of 20° C., according to DIN 53019.

In a particularly preferred embodiment of the presently claimed invention the at least one non-polymerizable, non-polar silicone oil having at least one poly(dimethylsilyloxy)-group has a viscosity in the range from 1000 m²/sec to ≤30000 m²/sec at a temperature of 20° C., according to DIN 53019. More preferably the viscosity is in the range from ≥2000 m²/sec to ≤30000 m²/sec, even more preferably the viscosity is in the range from ≥5000 m²/sec to ≤30000 m²/sec, further more preferably the viscosity is in the range from ≥8000 m²/sec to ≤30000 m²/sec, most preferably the viscosity is in the range from ≥9000 m²/sec to 30000 m²/sec, even most preferably the viscosity is in the range from ≥10000 m²/sec to 30000 m²/sec, at a temperature of 20° C., according to DIN 53019.

In an embodiment, the emulsion of the presently claimed invention is an oil-in-water emulsion. The emulsion may be characterized by average volume particle of the dispersed silicone oil in a continuous aqueous phase. Droplet (oil-in-water emulsion) as well as particle (polymer dispersion) size can be measured by using dynamic light scattering (DLS) technique (also known as photon correlation spectroscopy (PSC) or quasi-elastic light scattering (QELS)). Suitable laser diffraction techniques are well known in the art. The particle size is obtained from a particle size distribution (PSD). The PSD can be determined on a volume, surface or length basis. The volume particle size is equal to the diameter of the sphere that has the same volume as a given particle.

The term Dv represents the average volume particle size of the dispersed particles. Dv 50 is the particle size measured in volume corresponding to 50% of the cumulative particle population. In other words, if Dv=0.5 μm, 50% of the particles have an average volume particle size below 0.5 μm and 50% of the particles have a volume average particle size above 0.5 μm. Similarly, Dv 90 is the particle size measured in volume corresponding to 90% of the cumulative particle population.

The average particle size of emulsion droplets Dv 50 for the silicone emulsions of the state of the art is in the range from 1 to 50 μm which leads to increase in haze and decrease in gloss for the dried coating. Moreover, a narrow particle size distribution is required for stability of the dispersion in the coating formulation.

In an embodiment of the presently claimed invention, the emulsion droplets have an average size Dv 50 in the range from ≥10 nm to ≤10000 nm, preferably in the range from ≥10 nm to ≤5000 nm, more preferably in the range from ≥10 nm to ≤1000 nm, most preferably in the range from ≥10 nm to ≤500 nm, determined according to DLS technique with a fixed scattering angle of 90° or 180°.

In particular, the emulsion droplets have an average size Dv 50 in the range from ≥10 nm to ≤500 nm, preferably in the range from ≥10 nm to ≤450 nm, more preferably in the range from ≥10 nm to ≤400 nm, even more preferably in the range from ≥10 nm to ≤350 nm, most preferably in the range from ≥10 nm to ≤300 nm or in the range from ≥10 nm to ≤250 nm, determined according to DLS technique with a fixed scattering angle of 90° or 180°.

In another embodiment of the presently claimed invention, the emulsion droplets have an average size Dv 50 in the range from ≥10 nm to ≤250 nm, preferably in the range from ≥10 nm to ≤200 nm, more preferably in the range from ≥10 nm to ≤150 nm, even more preferably in the range from ≥10 nm to ≤100 nm, further more preferably in the range from ≥10 nm to ≤50 nm, most preferably in the range from ≥10 nm to ≤30 nm or in the range from ≥10 nm to ≤20 nm, determined according to DLS technique with a fixed scattering angle of 90° or 180°.

In a preferred embodiment of the presently claimed invention, the average particle size of emulsion droplet is less than 500 nm, more preferably less than 250 nm.

In another preferred embodiment of the presently claimed invention the emulsion comprises a micelle having average size Dv 50 in the range from ≥10 nm to ≤100 nm determined according to DLS technique with a fixed scattering angle of 90° or 180°.

In another embodiment of the presently claimed invention the emulsion droplets have an average size Dv 90 in the range from ≥10 nm to ≤100 nm determined according to DLS technique with a fixed scattering angle of 90° or 180°.

In another embodiment of the presently claimed invention the block copolymer has a polydispersity index PDI in the range from ≥1.1 to ≤1.8, preferably in the range from ≥1.1 to ≤1.5, more preferably in the range from ≥1.1 to ≤1.3, determined according to gel permeation chromatography with polystyrene standards.

In an embodiment of the presently claimed invention the weight ratio of the at least one non-polymerizable non-polar silicone oil having at least one poly(dimethylsilyloxy)-group to the at least one block copolymer is in the range from ≥0.01:1 to ≤100:1. Preferably, the weight ratio is in the range from ≥0.02:1 to ≤75:1, more preferably the weight ratio is in the range from ≥0.02:1 to ≤50:1, even more preferably the weight ratio in the range from ≥0.05:1 to ≤20:1, further more preferably the weight ratio is in the range from ≥0.1:1 to ≤10:1 or in the range from ≥0.2:1 to ≤5:1, and most preferably the weight ratio is in the range from 0.5:1 to ≤2.5:1.

In particular, the weight ratio of the at least one non-polymerizable non-polar silicone oil having at least one poly(dimethylsilyloxy)-group to the at least one block copolymer is in the range from ≥0.05:1 to ≤20:1. Preferably, the weight ratio is in the range from ≥0.1:1 to ≤10:1, more preferably the weight ratio is in the range from ≥0.2:1 to ≤8:1, even more preferably the weight ratio is in the range from ≥0.3:1 to ≤6:1, further more preferably the weight ratio is in the range from ≥0.4:1 to ≤4:1, and most preferably the weight ratio is in the range from ≥0.5:1 to ≤2.5:1.

In another embodiment of the presently claimed invention the weight ratio of the at least one non-polymerizable non-polar silicone oil having at least one poly(dimethylsilyloxy)-group to the at least one block copolymer is in the range from ≥0.5:1 to ≤2.5:1. Preferably, the weight ratio is in the range from ≥0.6:1 to ≤2.0:1, more preferably the weight ratio is in the range from ≥0.7:1 to ≤1.8:1, even more preferably the weight ratio is in the range from 0.8:1 to ≤1.5:1, and most preferably the weight ratio is in the range from 0.9:1 to ≤1.2:1.

In an embodiment, in the composition of the presently claimed invention, the amount of the at least one block copolymer is in the range from ≥0.1 wt.-% to ≤10 wt.-%, preferably in the range from ≥0.5 wt.-% to ≤10 wt.-%, more preferably in the range from ≥1 wt.-% to ≤10 wt.-%, even more preferably in the range from ≥2 wt.-% to ≤10 wt.-%, further more preferably in the range from ≥2 wt.-% to ≤9 wt.-%, most preferably in the range from ≥3 wt.-% to ≤8 wt.-, based upon the total weight of the composition; the amount of the at least one non-polymerizable, non-polar silicone oil having at least one poly(dimethylsilyloxy)-group is in the range from ≥0.1 wt.-% to ≤70 wt.-%, preferably in the range from ≥10 wt.-% to ≤70 wt.-%, more preferably in the range from ≥20 wt.-% to ≤70 wt.-%, even more preferably in the range from ≥25 wt.-% to ≤65 wt.-%, further more preferably in the range from ≥30 wt.- to ≤65 wt.-%, most preferably in the range from ≥30 wt.-% to ≤60 wt.-%, based upon the total weight of the composition; and the amount of water is in the range from 20 wt.-% to ≤98.8 wt.-%, preferably in the range from ≥25 wt.-% to ≤90 wt.-%, more preferably in the range from ≥25 wt.-% to ≤80 wt.-%, even more preferably in the range from ≥30 wt.-% to ≤70 wt.-%, further more preferably in the range from ≥30 wt.-% to ≤60 wt.-%, most preferably in the range from ≥35 wt.-% to ≤55 wt.-% based upon the total weight of the composition, based upon the total weight of the composition.

In an embodiment according to the presently claimed invention, the composition in form of an emulsion has a solid content in the range from ≥10% to ≤75%, preferably in the range from ≥20% to ≤70%, more preferably in the range from ≥30% to ≤70% and most preferably in the range from ≥40% to ≤70%.

In an embodiment of the presently claimed invention the at least one block copolymer is produced by controlled polymerization. A few examples of controlled polymerization are:

Group transfer polymerization (GTP) as described, for example, in U.S. Pat. No. 4,656,226.

The reversible addition-fragmentation chain transfer polymerization RAFT using chain transfer agents which react by reversible addition—fragmentation chain transfer as described, for example, in WO 1998/01478, WO 1999/05099 or WO 1999/31144.

Atom transfer radical polymerization (ATRP) as, for example, described in WO 1996/30421.

Polymerization in the presence of alkoxyamine initiator/ regulator compounds as described, for example, in U.S. Pat. No. 4,581,429 or EP 0621878 or polymerization in the presence of a stable nitroxyl free radical and a radical initiator (source of free radicals) as described, for example, in WO 1994/11412 A (nitroxide mediated controlled polymerization).

In another embodiment of the presently claimed invention the at least one block copolymer is produced by controlled polymerization selected from nitroxide-mediated controlled polymerization (NMP), atom transfer radical polymerization (ATRP), or reversible addition fragmentation chain transfer polymerization (RAFT).

In preferred embodiment of the presently claimed invention the at least one block copolymer is produced by controlled radical polymerization selected from nitroxide-mediated controlled polymerization (NMP) and atom transfer radical polymerization (ATRP), even more preferably from NMP Details about nitroxide-mediated controlled polymerization are described e.g. in WO 2005/059048 and WO 2009/103613. The initiator compounds described therein can be used in the present invention as well.

In another preferred embodiment of the presently claimed invention the at least one block copolymer is obtained by nitroxide-mediated controlled radical polymerization using a polymerization regulator compound which is selected from one of the following formulae (A), (B) and (C) or based on the corresponding stable free nitroxyl radicals in conjunction with a radical source:

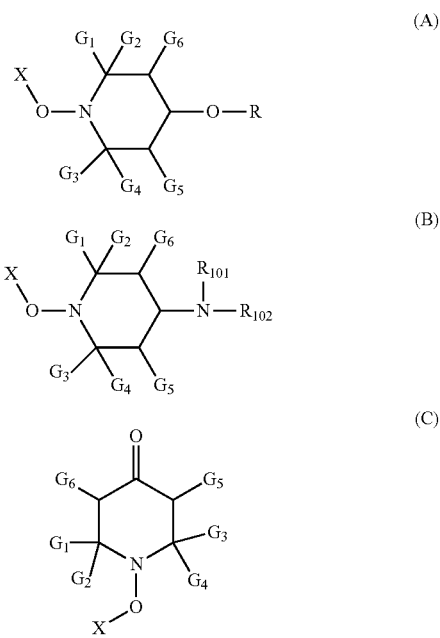

wherein

R is hydrogen, $C_1$-$C_{18}$ alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atom $R_{101}$ is $C_1$-$C_{12}$ alkyl, $C_5$-$C_7$ cycloalkyl, $C_7$-$C_8$ aralkyl, $C_2$-$C_{18}$ alkanoyl, $C_3$-$C_5$ alkenoyl or benzoyl;

$R_{102}$ is $C_1$-$C_{18}$ alkyl, $C_5$-$C_7$ cycloalkyl, $C_2$-$C_8$ alkenyl, which can be unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$G_6$ is hydrogen, $G_5$ is hydrogen or $C_1$-$C_4$ alkyl, $G_1$ and $G_3$ are methyl $G_2$ and $G_4$ are ethyl or propyl, or $G_1$ and $G_2$ are methyl and $G_3$ and $G_4$ are ethyl or propyl; and X is selected from $CH_2$-phenyl, $CH_3CH$-phenyl, $(CH_3)_2$C-phenyl, $(C_5$-$C_6$ cycloalkyl$)_2$CCN, $(CH_3)_2$CCN,

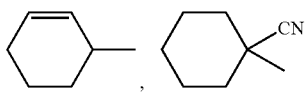

$CH_2CH=CH_2$, $CH_3CH-CH=CH_2$, $(C_1-C_4alkyl)CR_{20}-C(O)$-phenyl, $(C_1-C_4)alkyl-CR_{20}-C(O)-(C_1-C_4)alkoxy$, $(C_1-C_4)alkyl-CR_{20}-C(O)-(C_1-C_4)alkyl$, $(C_1-C_4)alkyl-CR_{20}-C(O)-N-di(C_1-C_4)alkyl$, $(C_1-C_4)alkyl-CR_{20}-C(O)-NH(C_1-C_4)alkyl$, $(C_1-C_4)alkyl-CR_{20}-C(O)-NH_2$, wherein $R_{20}$ is hydrogen or $(C_1-C_4)alkyl$; and wherein $R_{20}$ is hydrogen or $(C_1-C_4\ alkyl)$; and wherein any of the alkyl groups can be unsubstituted or substituted, e.g. by one or more functional groups such as hydroxyl, amino, carboxylic acid, halide, cyano, and/or carbonyl.

The above polymerization regulator compounds as well as their corresponding stable free nitroxyl radicals and their preparation are described in GB 2335190 and GB 2361235.

In another embodiment of the presently claimed invention the at least one block copolymer can be a diblock copolymer, i.e. it comprises one block A and one block B; a triblock copolymer, i.e. it comprises one block A and two blocks B to represent a triblock copolymer of the sequence B-A-B or it comprises two blocks A and one block B to represent a triblock copolymer of the sequence A-B-A;

or a multiblock copolymer, i.e. it comprises one, two, three or more blocks A and one, two, three or more blocks B.

The block copolymer can be linear, or branched (such as star-shaped, comb-shaped, etc.).

In the presently claimed invention, the term "block copolymer" also includes a gradient and/or tapered block copolymer. This type of structured copolymer is also generally known to the skilled person.

In an embodiment, a process for preparing a composition in form of an emulsion according to the presently claimed invention is provided wherein the composition is prepared, without using an additional surfactant, comprising the steps of—
  i) preparing a block copolymer solution by controlled radical polymerization by reacting at least one unsaturated monomer selected from the group consisting of (meth)acrylates and reacting (meth)acrylic acid;
  ii) mixing the block copolymer solution obtained in step i) in water and adding non-polymerizable, non-polar silicone oil having at least one poly(dimethylsilyloxy)-group to obtain a pre-emulsion; and
  iii) homogenizing the pre-emulsion obtained in step ii) to obtain the composition in form of an emulsion having emulsion droplets of an average size $Dv_{50}$ in the range from $\geq 100$ nm to $\leq 10000$ nm determined according to dynamic light scattering technique with a fixed scattering angle of 90° or 180°.

In an embodiment of the presently claimed invention the process for preparing the composition in form of an emulsion preferably comprises a step of neutralizing the block copolymer solution of step i) by reacting with a neutralizing agent to obtain micellar block copolymer solution.

In another preferred embodiment, the process for preparing a composition in form of an emulsion according to the presently claimed invention is provided wherein the composition is prepared without using an additional surfactant, the process comprises the steps of:

i) preparing a block copolymer solution by nitroxide-mediated controlled radical polymerization by reacting at least one unsaturated monomer selected from the group consisting of (meth)acrylates and (meth)acrylic acid in the presence of a polymerization regulator compound based on free nitroxyl radical;
ii) mixing the block copolymer solution obtained in step i) in water and adding non-polymerizable, non-polar silicone oil having at least one poly(dimethylsilyloxy)-group to obtain a pre-emulsion; and
iii) homogenizing the pre-emulsion obtained in step ii) to obtain the composition in form of an emulsion having emulsion droplets of an average size $Dv_{50}$ in the range from 100 nm to 10000 nm determined according to dynamic light scattering technique with a fixed scattering angle of 90° or 180°.

In an embodiment of the presently claimed invention the process for preparing the composition in form of an emulsion preferably comprises a step of neutralizing the block copolymer solution of step i) by reacting with a neutralizing agent to obtain micellar block copolymer solution.

In another preferred embodiment, the process for preparing a composition in form of an emulsion according to the presently claimed invention is provided wherein the composition is prepared without using an additional surfactant, the process comprises the steps of—
  i) preparing a poly(meth)acrylate from (meth)acrylate in the presence of a polymerization regulator compound based on free nitroxyl radical;
  ii) preparing a block copolymer solution by mixing the poly(meth)acrylate obtained from step i) with (meth)acrylic acid and solvent;
  iii) mixing the block copolymer solution obtained in step ii) in water and adding non-polymerizable, non-polar silicone oil having at least one poly(dimethylsilyloxy)-group to obtain a pre-emulsion; and
  iv) homogenizing the pre-emulsion obtained in step ii) to obtain the composition in form of an emulsion having emulsion droplets of an average size $Dv_{50}$ in the range from 100 nm to $\leq 10000$ nm determined according to dynamic light scattering technique with a fixed scattering angle of 90° or 180°.

In another preferred embodiment, the process for preparing a composition in form of an emulsion according to the presently claimed invention is provided wherein the composition is prepared without using an additional surfactant, the process comprises the steps of—
  i) preparing a poly(n-butyl acrylate) from n-butyl acrylate in the presence of a polymerization regulator compound based on free nitroxyl radical;
  ii) preparing a block copolymer solution by mixing the poly(n-butyl acrylate) obtained from step i) with (meth)acrylic acid and solvent;
  iii) mixing the block copolymer solution obtained in step ii) in water and adding non-polymerizable, non-polar silicone oil having at least one poly(dimethylsilyloxy)-group to obtain a pre-emulsion; and
  iv) homogenizing the pre-emulsion obtained in step ii) to obtain the composition in form of an emulsion having emulsion droplets of an average size $Dv_{50}$ in the range from 100 nm to $\leq 10000$ nm determined according to dynamic light scattering technique with a fixed scattering angle of 90° or 180°.

In an embodiment of the presently claimed invention the process for preparing the composition in form of an emulsion preferably comprises a step of neutralizing the block copolymer solution of step ii) by reacting with a neutralizing agent to obtain micellar block copolymer solution.

In an embodiment of the presently claimed invention the process for preparing the composition in form of an emulsion optionally comprises adding a solvent to dissolve silicone oil to obtain a silicon solution.

It is beneficial to preferably bring silicone in form of a solution as solution reduces viscosity as compared to pure silicone and homogenization of solution into emulsion is thereby facilitated.

In an embodiment of the presently claimed invention the process for preparing the composition in form of an emulsion optionally comprises removing the solvent used to dissolve the silicone oil.

In an embodiment of the presently claimed invention the process for preparing the composition in form of an emulsion, the solvent is selected from the group consisting of toluene, xylene, hexamethyldisiloxane, D4, naptha, cyclohexane, n-hexane, n-heptane, diisopropyl ether, hexyl ether, ethyl acetate, butyl acetate, isopropyl laurate, isopropyl palmitate, isopropyl myristate, methyl ethyl ketone, methyl isobutyl ketone, lauryl alcohol, trichloroethylene, perchloroethylene and methylene chloride.

In a preferred embodiment, the solvent is selected from the group consisting of toluene, xylene, D4 and hexamethyldisiloxane.

In an embodiment of the presently claimed invention the process for preparing the composition in form of an emulsion preferably comprises adding non-polymerizable, non-polar silicone oil having at least one poly(dimethylsilyloxy)-group (PDMS) with hexamethyldisiloxane (HMDS), into the block copolymer solution to obtain a pre-emulsion.

Suitable neutralizing agents are inorganic bases, organic bases, and combinations thereof. Examples of inorganic bases include, but are not limited to, the alkali metal hydroxides (especially lithium, sodium, potassium, magnesium, and ammonium), alkali metal carbonates, alkali metal hydrogen carbonates and alkali metal salts of inorganic acids, such as sodium borate (borax), sodium phosphate, sodium pyrophosphate, and the like; and mixtures thereof. Examples of organic bases include but are not limited to triethanolamine (TEA), diisopropanolamine, triisopropanolamine, aminomethyl propanol (2-amino-2-methyl-1-propanol), dodecylamine, cocamine, oleamine, morpholine, triamylamine, triethylamine, tetrakis(hydroxypropyl) ethylenediamine, L-arginine, methyl glucamine, isopropylamine, aminomethyl propanol, tromethamine (2-amino 2-hydroxymethyl-1,3-propanediol), and PEG-15 cocamine. Alternatively, other alkaline materials can be used alone or in combination with the above-mentioned inorganic and organic bases.

Preferably, the neutralizing agent is selected from the group consisting of an alkyl alkanolamine, alkali metal hydroxide, alkali metal carbonate, alkali metal hydrogen carbonate and ammonia.

In an embodiment, the composition of the presently claimed invention is used as an additive in polymer based aqueous coating compositions, printing ink compositions, personal care products, textiles and food contact applications.

In another embodiment, the composition of the presently claimed invention when used as an additive in aqueous coating compositions, printing ink compositions, personal care products, textiles and food material provides at least one of the following effects:
reduction of the static or dynamic coefficient of friction of the coating or ink,
increasing the anti-blocking properties of the coating, ink or in food contact applications,
increasing stain resistance of the coating or ink,
imparting anti-graffiti properties to the coating or ink,
imparting hydrophobic properties or water repellence to the coating or ink,
smoothening effect in personal care products, and
finishing effect in textile.

In an embodiment of the presently claimed invention, an aqueous composition in the form of a coating composition or printing ink composition or personal care composition is provided, which comprises the composition in form of an emulsion according to the presently claimed invention in the range from ≥0.01 wt.-% to: ≤20 wt.-%, preferably in the range from ≥0.01 wt.-% to ≤15 wt.-%, more preferably in the range from ≥0.01 wt.-% to ≤10 wt.-%, even more preferably in the range from ≥0.1 wt.-% to 10≤1 wt.-%, furthermore preferably in the range from ≥0.1 wt.-% to 7≤wt.-%, most preferably in the range from ≥0.1 wt.-% to ≤5 wt.-% or in the range from ≥0.1 wt.-% to ≤3 wt.-%, as an additive, based on the total weight of the aqueous composition; and additionally, pigments, fillers, binders, solvents, defoamer, acrylic emulsions, surfactants and dispersing agents, whereby the sum of weight percentages of components adds up to 100% by weight.

Pigments

Organic or inorganic pigments are suitable as additives. Examples of organic pigments are color pigments and mother-of-pearl-like pigments such as azo, disazo, naphthol, benzimidazolone, azo condensation, metal complex, isoindolinone, quinophthalone, and dioxazine pigments, polycyclic pigments such as indigo, thioindigo, quinacridones, phthalocyanines, perylenes, perinones, anthraquinones, e.g., aminoanthraquinones or hydroxyanthraquinones, anthrapyrimidines, indanthrones, flavanthrones, pyranthrones, anthanthrones, isoviolanthrones, diketopyrrolopyrroles, and also carbazoles, e.g., carbazole violet, and the like. Other examples of organic pigments can be found in the following monograph: W. Herbst, K. Hunger, "Industrielle Organische Pigmente", $2^{nd}$ edition, 1995, VCH Verlagsgesellschaft, ISBN: 3-527-28744-2. Examples of inorganic pigments are titanium dioxide, metallic flakes, such as aluminum and also aluminum oxide, iron (Ill) oxide, chromium (Ill) oxide, titanium (IV) oxide, zirconium(IV)oxide, zinc oxide, zinc sulfide, zinc phosphate, mixed metal oxide phosphates, molybdenum sulfide, cadmium sulfide, graphite, vanadates such as bismuth vanadate, chromates, such as lead(IV) chromates, molybdates such as lead(IV) molybdate, and mixtures thereof.

Fillers

Suitable fillers are, for example, organic or inorganic particulate materials such as, for example, calcium carbonates and silicates, and also inorganic fiber materials such as glass fibers, for example. Organic fillers as well, such as carbon fibers, and mixtures of organic and inorganic fillers, such as mixtures of glass fibers and carbon fibers or mixtures of carbon fibers and inorganic fillers, for example, may find application. The fillers can be added in an amount of 1 wt.-% to 75 wt.-%, based on the total weight of the composition.

Binders

Suitable binders are the ones customarily used, for example the ones described in 30 Ullmann's Encyclopedia of Industrial Chemistry, 5th Edition, Vol. A18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also, resins curable by radiation or air-drying 35 resins can be used. Binders may also be derived from polyvinylalcohol and polyvinylbutyral. Binders include latex polymers made by emulsion polymerization. For architectural coatings, especially preferred latex polymers are based on acrylic emulsion polymers, styrene-acrylic emulsion polymers, vinyl acetate-acrylic emulsion polymers or emulsion polymers based on ethylene and vinyl acetate. Preferably, the binder is present in the range of from 2 wt.-% to 40 wt.-%, more preferably in the range of from 5 wt.-% to 30 wt.-%, based on the weight of the paint composition.

Surfactants

The surfactant may be an anionic surfactant, cationic surfactant, nonionic surfactant, amphoteric surfactant, or a mixture of any of these surfactants.

Representative examples of suitable anionic surfactants include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Representative examples of suitable cationic surfactants include alkylamine salts, quaternary ammonium salts, sulfonium salts, and phosphonium salts. Representative examples of suitable nonionic surfactants include condensates of ethylene oxide with long chain fatty alcohols or fatty acids such as a $C_{12}$-$1_6$ alcohol, condensates of ethylene oxide with an amine or an amide, condensation products of ethylene and propylene oxide, esters of glycerol, sucrose, sorbitol, fatty acid alkylol amides, sucrose esters, flouro-surfactants, and fatty amine oxides. Representative examples of suitable amphoteric surfactants include imidazoline compounds, alkylaminoacid salts, and betaines.

Representative examples of suitable commercially available non-ionic surfactants include polyoxyethylene fatty alcohols sold under the tradename BRIJ by Uniqema (ICI Surfactants), Wilmington, Del. Some examples are BRIJ 35 Liquid, an ethoxylated alcohol known as polyoxyethylene (23) lauryl ether, and BRIJ 30, another ethoxylated alcohol known as polyoxyethylene (4) lauryl ether. Some additional nonionic surfactants include ethoxylated alcohols sold under the trademark TERGITOL® by The Dow Chemical Company, Midland, Mich. Some example are TERGITOL® TMN-6, an ethoxylated alcohol known as ethoxylated trimethylnonanol; and various of the ethoxylated alcohols, i.e., $C_{12}$-$C_{14}$ secondary alcohol ethoxylates, sold under the trademarks TERGITOL®15-S-5, TERGITOL®15-S-12, TERGITOL®15-S-15, and TERGITOL® 15-S-40.

Defoamers

Suitable defoamers are selected from the wide range of defoamer used for water based systems such as silicone based defoamers, emulsion defoamers, star polymer based defoamers, powder defoamers, oil based defoamers.

Solvents

The solvent is selected from any organic solvents that are typically used to prepare coating compositions. The organic solvent may include a combination of two or more solvents. Preferably, the organic solvent is an alcohol, glycol or acetone. The glycol solvent helps reduce viscosity and may aid wetting or film coalescence. Representative glycol solvents include ethylene glycol, ethylene glycol methyl ether, ethylene glycol ethyl ether, ethylene glycol monobutyl ether, ethylene glycol-2-ethylhexyl ether, propylene glycol, propylene glycol methyl ether, propylene glycol ethyl ether, propylene glycol monobutyl ether, propylene glycol-2-ethylhexyl ether, diethylene glycol, diethylene glycol methyl ether, diethylene glycol ethyl ether, diethylene glycol monobutyl ether, diethylene glycol-2-ethylhexyl ether, dipropylene glycol, dipropylene glycol methyl ether, dipropylene glycol ethyl ether, dipropylene glycol monobutyl ether, dipropylene glycol-2-ethylhexyl ether, and mixtures thereof hydrophilic glycol solvents (e.g., propylene glycol methyl ether or dipropylene glycol monomethyl ether) are preferred.

In one embodiment, the organic solvent is an alcohol. Representative alcohol solvents include both lower molecular weight alcohols; such as methanol, ethanol, propanol, and butanol; as well as branched hydrocarbyl based alcohols like Texanol® solvents; such as 2,2,4-trimethyl-1,3-pentanediolmono(2-methylpropanoate).

Most preferably, the organic solvent is a combination of a glycol and alcohol, as described above, for example an isomeric mixture of dipropylene glycol monomethyl ether, methoxypropoxypropanol and methyldipropylene glycol.

Acrylic Emulsions

Acrylic emulsions in context of the present invention refer to any water based emulsion of a polyacrylate, polymethacrylate, or other similar copolymers derived from acrylic or methacrylic acid. Many acrylic emulsions are available commercially for ready use in paints and coating formulations. These acrylic emulsions are often described as self-crosslinkable acrylic emulsions, which may be used in the present coating compositions. Representative self-crosslinkable acrylic emulsions include useful in the present compositions include; ALBERDINGK AC 2S14, ALBERDINGK AC 25142, ALBERDINGK AC 2518, ALBERDINGK AC 2523, ALBERDINGK AC 2524, ALBERDINGK AC 2537, ALBERDINGK AC 25381, 40 ALBERDINGK AC 2544, ALBERDINGK AC 2546, ALBERDINGK MAC 24, and ALBERDINGK MAC 34 polymer dispersions from Alberdingk Boley, Inc.; EPS 2538 and EPS 2725 acrylic emulsions from EPS Corp.; RHOPLEX™ 3131-LO, RHOPLEX E-693, RHOPLEX E-940, RHOPLEX E-1011, RHOPLEX E-2780, RHOPLEX HG-95P, RHOPLEX HG-700, RHOPLEX HG-706, RHOPLEX PR-33, RHOPLEX TR-934HS, RHOPLEX TR-3349 and RHOPLEX™ VSR-1050 acrylic emulsions from Rohm and Haas Co.; RHOSHIELD™ 636 and RHOSHELD 3188 polymer dispersions from Rohm and Haas Co; JONCRYL®8380, 8300, 8211, 1532, 1555, 2560, 1972, 1980, 1982, and 1984 acrylic emulsions from BASF Corp.; NEOCRYL™ A-I 127, NEOCRYL A-6115, NEOCRYL XK-12, NEOCRYL XK-90, NEOCRYL XK-98 and NEOCRYL XK-220 acrylic latex polymers from DSM NeoResins, Inc., and mixtures thereof.

Depending on the intended use, the aqueous composition may further comprise one or more conventional additives. Conventional additives included e.g., rheology modifiers, wetting agents, neutralizer, organically modified polysiloxane, UV absorbers, matting agents, pigment dispersing agents, pigment synergists, preservatives, and the like.

Neutralizers

Suitable neutralizers are inorganic bases, organic bases, and combinations thereof. Examples of inorganic bases include but are not limited to the alkali metal hydroxides (especially lithium, sodium, potassium, magnesium, and ammonium), alkali metal carbonates, alkali metal hydrogen carbonates and alkali metal salts of inorganic acids, such as sodium borate (borax), sodium phosphate, sodium pyrophosphate, and the like; and mixtures thereof. Examples of organic bases include, but are not limited to, triethanolamine (TEA), diisopropanolamine, triisopropanolamine, aminomethyl propanol (2-amino-2-methyl-1-propanol), dodecylamine, cocamine, oleamine, morpholine, triamylamine, triethylamine, tetrakis(hydroxypropyl)ethylenediamine, L-arginine, methyl glucamine, isopropylamine, aminomethyl propanol, tromethamine (2-amino 2-hydroxymethyl-1,3-propanediol), and PEG-15 cocamine. Alternatively, other alkaline materials can be used alone or in combination with the above-mentioned inorganic and organic bases.

UV Absorbers

UV absorbers used are selected from the group consisting of benzotriazole derivatives, dimeric benzotriazole derivatives, halogenated benzotriazoles, benzophenone derivatives, triazine derivatives, dimeric triazine derivatives and diaryl cyanoacrylates etc.

Matting agents used are silica based matting agents or polymethyl urea resin.

The aqueous composition in the form of a coating composition or printing ink composition or personal care composition or composition for food contact application is prepared by simply combining the composition of the present invention and other ingredients as discussed above with mixing.

The composition of the present invention is useful in personal care products such as anti-perspirants and deodorants, skin care creams, skin care lotions, moisturizers, facial treatments such as acne or wrinkle removers, personal and facial cleansers, bath oils, perfumes, colognes, sachets, sunscreens, pre-shave and after-shave lotions, shaving soaps, and shaving lathers, hair shampoos, hair conditioners, hair colorants, hair relaxants, hair sprays, mousses, gels, permanents, depilatories, and cuticle coats, make-ups, color cosmetics, foundations, concealers, blushes, lipsticks, eyeliners, mascara, oil removers, color cosmetic removers, and powders, medicament creams, pastes or sprays including antiacne, dental hygienic, antibiotic, healing promotive, nutritive and the like, which may be preventative and/or therapeutic.

The composition of the present invention when used as an additive in indirect food contact applications allow for Swiss A and FDA compliance due to e.g. its components and molecular weight.

In another embodiment, the present invention provides a method for reducing the dynamic CoF, improving the anti-blocking behavior, surface levelling performance i.e. reduced crater formation and optical properties such as high gloss and lower haze of aqueous compositions when composition in form of an emulsion according to presently claimed invention is combined with the aqueous composition.

The composition of the presently claimed invention offers one or more of the following advantages:
1. When used in the aqueous coating formulations as an additive, the composition of the present invention provides improved slip and mar resistance, anti-blocking behavior, surface levelling performance and optical properties to the dried coating layer. Additionally, the composition provides stain resistance, imparts anti-graffiti properties and water resistance to the dried coating layer.
2. The composition of the present invention, when used as an additive in indirect food contact applications, provides improved anti-blocking properties allowing for example, the films and wraps, Swiss A and FDA compliant.
3. The composition of the present invention imparts smoothing effect in personal care products and finishing effects in textiles and leather.
4. Environment friendly as the composition of the present invention contains low amounts of volatile organic compounds.

Having generally described the invention, a further understanding can be obtained by reference to certain specific examples which are provided herein for the purpose of illustration only, and are not intended to be limiting unless otherwise specified.

Examples

Compounds

NOR-1, $C_{20}H_{31}NO_2$ {4-piperidinone, 2,6-diethyl-2,3,6-trimethyl-1-(1-phenylethoxy)-}, polymerization regulator compound;

n-Butyl acrylate (CAS: 141-32-2), $C_7H_{12}O_2$ (2-propenoic acid, butyl ester);

Methacrylic acid (CAS: 79-41-4), $C_4H_6O_2$ (2-propenoic acid, 2-methyl-);

Acetone (CAS: 67-64-1);

Isopropanol;

Acronal® LR 9014, an acrylic binder;

Joncryl® 8052 (CAS: 1185260-57-4), an acrylic acid emulsion;

Hydropalat® WE 3221, blend of organically modified polysiloxane with dipropylene glycol monomethyl ether;

Solvenon® DPM, solvent (CAS No. 34590-94-8);

Tinuvin® 1130, a liquid UV absorber of the hydroxyphenyl benzotriazole class;

Rheovis® PU 1190, hydrophobically modified ethoxylated urethane (HEUR);

Rheovis® HS 1162, hydrophobically modified (HASE) anionic poly-acrylate copolymer; are avaliable from BASF SE, Ludwigshafen, Germany.

2-Amino-2-methylpropanol (CAS:124-68-5), $C_4H_{11}NO$ (1-Propanol, 2-amino-2-methyl-);

Sodium hydroxide; and

Ethanol (CAS: 64-17-5), are available from Sigma-Aldrich.

Hexamethyldisiloxane (HMDS) 90%; and

GENIOPLAST® Gum, an ultra-high molecular weight polydimethylsiloxane (silicone gum), having a viscosity of 20000 $m^2$/sec, are available from Wacker Chemie AG.

Element14 PDMS 100, linear polydimethylsiloxane polymer, having a viscosity of 0.1 $m^2$/sec is available from Momentive Performance Materials Inc.

KORASILON® G30 M, polysiloxanes where some of the methyl groups are replaced by alkyl groups and/or aryl groups, having a viscosity of 30000 $m^2$/sec is available from Kurt Obermeier GmbH & Co. KG.

Dow Corning®51 (DC 51) Additive (CAS: 63148-53-8), an ultra-high molecular weight polysiloxanes silicone dispersion with 80 wt.-% solids and 10 wt.-% to 30 wt.-% surfactants ie. $C_{11}$ to $C_{15}$ ethoxylated secondary alcohol, is available from Dow Corning Corporation.

ACEMATT® TS 100 used as a matting agent (CAS No. 112945-52-5) is available from Evonik Resource Efficiency GmBH.

AMP™ 90, amino alcohol used as a neutralizer, is available from Dow Consumer & Industrial Solutions.

Methods

Emulsification

Emulsification can be carried out by any standard procedure known in the art. Comminution may be achieved by using high shear force dispersion devices, such as, for example an ultrasonic sound equipment (J. Dispersion Sci. Technology 2002, 23(1-3), 333-349) or a high-pressure homogenizer (APV Gaulin homogenizer; microfluidizer). The emulsification and comminution can be carried out continuously or batch wise. Apparatus for this purpose are known in the art. The standard procedure is for example described in U.S. Pat. No. 5,108,654. One such non-limiting example is as follows—mixing the block copolymer solution, water and adding polydimethylsiloxane (PDMS) solution in hexamethyldisiloxane (HMDS) to the mixture. After stirring for 30 minutes and homogenization with a APV Gaulin high pressure homogenizer at 600 bar, a kinetically stable miniemulsion was obtained. The mixture was stirred for 30 minutes and treated with ultrasound using a Bandelin Sonoplus, Generator GM 2200, 200 W, 20 kHz, at 60% power for 20 minutes per 500 g of emulsion to obtain a kinetically stable emulsion.

Particle Size Measurement

Micelle size and emulsion droplet size is measured by using dynamic light scattering (DLS) technique (also known as photon correlation spectroscopy (PSC) or quasi-elastic light scattering (QELS)). For this kind of measurement, a particle sizer (NANO-Flex® 180° DLS System, Particle Metrix GmbH, Meerbusch, Germany) with a fixed scattering angle of 90° or 180° was used. The measurement leads to the mean diameter DINT i.e. length of intermediate axis of the particle (intensity weighted). The term Dv represents the average volume particle size of the dispersed particle, for example Dv 50 is the particle size measured in volume corresponding to 50% of the cumulative particle population.

Molecular Weight

Molecular weight was determined using gas phase chromatography (GPC). GPC was measured against polystyrene standards (polystyrene (PS) molar mass range 580-6870000 g/mol, PSS) in tetrahydrofuran (THF), 0.1% trifluoroacetic acid on two serial 30 cm PLgel MIXED-B columns at 35° C. and 1 ml/minute flow. The concentration of the sample was 2 mg/ml.

Viscosity

The reported viscosities are obtained either by a rheometer according to a method in dependence to DIN 53019 or calculated from values of a brabender plastograph.

NMR

Measurement was conducted using Einem 400 MHz-Spectrometer from Varian with a OneNMR-sample head or Einem Avance 400 MHz-Spectrometer from Bruker with a PASEI sample head.

Solid Content Solid content was measured with a Mettler Toledo Moisture Analyzer HB43. Samples were dried at 200° C. until constant mass was reached.

Acid Number

Acid number was measured by titration. Firstly, $m_1$ g (0.1 g to 0.5 g) material was completely dissolved in tetrahydrofuran/ethanol (THF/EtOH) mixture (THF 25 parts, and EtOH of 75 parts). Then, a titration curve was created using a 0.1 N aqueous KOH solution. From the difference between the second inflection point and the first inflection point in the curve (amount of the 0.1 N KOH solution, $n_1$ delta ml), the acid number was calculated as follows: Acid number=5.6× $n_1/m_1$.

Coefficient of Friction

The coefficient of friction (CoF) can be determined using any standard procedure known in the art. One such non-limiting example is as follows—formulations are prepared by hand mixing. Thereafter, formulations are defoamed in a Speedmixer Hauschild DAC 400.1 and applied with a wire bar of 60p on 2 PE-foils. Friction is measured after 1 day and 7 days of drying with a Ray-Ran test equipment. With this method, a 200 g sled is pulled over the coating surface and the force needed for this process is measured. The result is displayed as dynamic coefficient of friction without a unit.

Synthesis of Poly(n-Butyl Acrylate)

Synthesis of poly(n-butyl acrylate) was carried out using standard procedures known in the art. One such non-limiting example is provided below.

In a 250 ml flask, 181.7 g of n-butyl acrylate (nBA) and 3.0 g of NOR-1 were mixed. The mixture was stirred at room temperature and air was removed by a nitrogen stream. The temperature was increased from 25° C. to 115° C. and the reaction medium was reacted at 115° C. under a nitrogen atmosphere until solid content reached to an amount >50%.

Afterwards, the mixture was cooled to obtain poly(n-butyl acrylate) and the residual monomer was distilled off by vacuum distillation.

The number-average molecular weight (Mn) value for poly(n-butyl acrylate) measured using gas phase chromatography (THF, PS-standard) was found to be 9975 g/mol. The polydispersity index (PDI) was 1.30.

Synthesis of Block Copolymer Solution

The block copolymer solution of poly(n-butyl acrylate) and methacrylic acid were obtained by standard polymerization methods. Two non-limiting example of such methods are provided herein below.

Procedure 1

In a 2.5 liter stainless steel reactor, poly(n-butyl acrylate) obtained from the above mentioned method, methacrylic acid, ethanol and water were mixed in the amount provided in Table 1.

The mixture was stirred at room temperature and air was removed by a nitrogen stream. The temperature was increased from 25° C. to a temperature in the range from ≥125° C. to ≤145° C. and the reaction medium was reacted at under pressure until no further conversion of methacrylic acid took place. Thereafter, the mixture was cooled and discharged from the reactor.

Table 1 provides the block copolymer solution examples 1 to 8 prepared by following the method of procedure 1.

TABLE 1

| | Compounds | | | | Properties | |
|---|---|---|---|---|---|---|
| Example | poly (n-butyl acrylate) (in g) | methacrylic acid (in g) | ethanol (in g) | water (in g) | solid content (in %) | acid number (mg KOH/g) |
| 1 | 600 | 190.1 | 425.6 | 64 | 54.3 | 92.9 |
| 2 | 600 | 306.5 | 425.6 | 64 | 56.2 | 142.8 |
| 3 | 900.1 | 285.3 | 375.2 | 39.4 | 65.5 | 122.6 |
| 4 | 1115.2 | 353.5 | 464.8 | 48.8 | 65.3 | 119.5 |
| 5 | 1133 | 359.2 | 472.3 | 49.6 | 64.4 | 122 |
| 6 | 1216.8 | 385.7 | 507.2 | 53.3 | 67.3 | 123.6 |
| 7 | 1100 | 275 | 458.3 | | 69.5 | 97.8 |
| 8 | 800 | 200 | 333 | | 69.8 | 97.8 |

Procedure 2

In a 2.5 liter stainless steel reactor, poly(n-butyl acrylate) obtained from the above mentioned method, methacrylic acid and acetone were mixed. The mixture was stirred at room temperature and air was removed by a nitrogen stream. The temperature was increased from 25° C. to a temperature in the range of ≥125° C. to ≤145° C. and the reaction medium was reacted at under pressure until no further conversion of methacrylic acid took place.

Thereafter, the mixture was further diluted with acetone (300 g), cooled and discharged from the reactor. The amount of poly(n-butyl acrylate), methacrylic acid and acetone used are provided in table 2.

Table 2 provides the block copolymer solution example 9 prepared by following the method of procedure 2.

TABLE 2

| | Compounds | | | Properties | |
|---|---|---|---|---|---|
| Example | poly(n-butyl acrylate) (in g) | methacrylic acid (in g) | acetone (in g) | solid content (in %) | acid number (mg KOH/g) |
| 9 | 600 | 405 | 450 | 52.5 | 150 |

Synthesis of Micellar Block Copolymer Solution

Micellar block copolymer solution is prepared by standard procedures known in the art. Two non-limiting examples of such methods are provided below.

Procedure 1

A solution made from block copolymer solution(s) obtained according to any of the examples 1 to 8 as mentioned above and isopropanol was charged. The mixture was stirred at room temperature and air was removed by a nitrogen stream. Thereafter, 2-amino-2-methylpropanol was added to the solution for acid neutralization. The internal temperature was increased from 25° C. to 75° C. and the reaction medium was slowly diluted with de-ionized water. As next step the solvent was removed by distillation under atmospheric pressure and/or vacuum. The examples and amount of block copolymer solution, isopropanol, amino-2-methylpropanol and de-ionized water used are provided in table 3.

TABLE 3

| | Compounds | | | | Properties | |
|---|---|---|---|---|---|---|
| Example | block copolymer solution (in g) | isopropanol/ ethanol (in g) | amino-2-methyl-propanol (in g) | deionized water (in g) | solid content (in %) | pH |
| 10 | 160 g of example 1 | 274 | 28.9 | 800 | 12.0 | 9.4 |
| 11 | 160 g of example 2 | 289 | 50.4 | 800 | 16.3 | 9.8 |
| 12 | 4000 g (1000 g of example 3, 1000 g of example 4, 1000 g of example 5 and 1000 g of example 6) | 9120 | 1028.2 | 20000 | 14.5 | 9.3 |
| 13 | 274 g of example 7 | 678.2 | 62 | 3196.7 | 14.5 | 9.3 |
| 14 | 160 g of example 8 | 398 | 28.8 | 800 | 15.7 | 9.6 |

Micelle size obtained by analytical ultracentrifugation and/or Microtrac particle size measurement for examples 10 to 14 is provided below in table 4.

TABLE 4

| Example | Dv 10 (in nm) | Dv 50 (in nm) | Dv 90 (in nm) | PDI (Dv 90 − Dv 10)/Dv 50 |
|---|---|---|---|---|
| 10 | 16 | 17 | 19 | 0.15 |
| 11 | 13 | 14 | 15 | 0.13 |
| 12 | 13 | 21 | 35 | 1.06 |
| 13 | 11 | 12 | 14 | 0.25 |
| 14 | 13 | 14 | 15 | 0.15 |

Procedure 2

Into a 5-liter reactor a solution made from block copolymer solution of example 9 and acetone was charged. The mixture was stirred at room temperature and air was removed by a nitrogen stream. The internal temperature was increased from 25° C. to 50° C. and the reaction medium was slowly diluted with deionized water. As next step the solvent was removed by distillation under atmospheric pressure. As soon as the polymer starts to precipitate sodium hydroxide in water was added. The distillation was continued until the internal temperature exceed 98° C. and/or all solvent was removed. The example and amount of block copolymer solution, acetone, sodium hydroxide and de-ionized water used are provided in table 5.

TABLE 5

| | Compounds | | | | Properties | |
|---|---|---|---|---|---|---|
| Example | block copolymer solution (in g) | acetone (in g) | NaOH 10 wt.-% (in g) | de-ionized water (in g) | solid content (in %) | pH |
| 15 | 450 g of example 9 | 730 | 145 | 2100 | 10.5 | 9.2 |

Synthesis of Aqueous Emulsion of Polydimethylsiloxane (PDMS)

A few non-limiting general procedures to obtain an emulsion of PDMS are provided below.

Procedure 1

In a 250-ml glass beaker, micellar block copolymer solution of example 15 and PDMS 100 were mixed for 10 minutes via a magnetic stir bar at 300 rpm. Thereafter, the pre-emulsion was homogenized by ultrasound for 10 minutes resulting in a storage stable fine emulsion.

The example and amount of micellar block copolymer solution and PDMS are given below in table 6.

TABLE 6

| | Compounds | | Property |
|---|---|---|---|
| Example | micellar block copolymer solution (in g) | PDMS (in g) | solid content (in %) |
| 16 | 50 g of example 15 | 52.5 | 56.3 |
| 17 | 20 g of example 15 | 42.5 | 71.4 |
| 18 | 50 g of example 15 | 36.75 | 48.4 |

Procedure 2

In an alternative procedure, an emulsion of PDMS is obtained following the method provided below.

In a 500-ml flask, micellar block copolymer solution obtained in example 12 and deionized water were mixed. The mixture was stirred at room temperature and slowly a PDMS solution in HMDS (10 wt % Korasilon G30 M in 90% Hexamethyldisiloxane (HMDS)) was added. Thereafter, the pre-emulsion was homogenized at 5000 rpm for 10 minutes, resulting in a storage stable fine emulsion. This emulsion was heated under nitrogen stream until internal temperature was >98° C. and all HMDS was removed. The example of micellar block copolymer solution, and amount of de-ionized water and PDMS solution in HMDS used is provided in table 7.

TABLE 7

| | Compounds | | | Properties | |
|---|---|---|---|---|---|
| Example | micellar block copolymer solution (in g) | de-ionized water (in g) | PDMS solution in HMDS (10 wt.-% Korasilon G 30 in 90% HMDS) (in g) | solid content (in %) | pH |
| 19 | 80 g of example 12 | 60 | 116 | 17.8 | 8 |
| 20 | 100 g of example 12 | 90 | 145 | 10.8 | 8 |
| 21 | 100 g of example 12 | 150 | 145 | 8.2 | 8 |
| 22 | 300 g of example 15 | 0 | 157.5 | 13.5 | 8 |

Procedure 3

In another alternative procedure, a PDMS emulsion is obtained following the method provided below.

In a 800 ml glass beaker, PDMS emulsion obtained in examples 22 to 25 and PDMS solution in HMDS (10 wt % Korasilon G30 M in 90% hexamethyldisiloxane) were mixed for 10 minutes via a magnetic stir bar at 300 rpm. Thereafter, the pre-emulsion was homogenized by ultrasound for 10 minutes resulting in a storage stable fine emulsion. This emulsion was heated under nitrogen stream until internal temperature was >98° C. and all HMDS was removed. The examples and amount of PDMS emulsion and PDMS solution in HMDS used are provided in table 8.

TABLE 8

| | Compounds | | Property |
|---|---|---|---|
| Example | PDMS emulsion (in g) | PDMS solution in HMDS (10 wt % Korasilon G30 M in 90% HMDS) (in g) | Solid content (in %) |
| 23 | 257.2 g of example 22 | 115.7 | 19.7 |
| 24 | 522 g example 23 | 210.5 | 16.3 |
| 25 | 479 g of example 24 | 259.6 | 22.2 |
| 26 | 438 g of example 25 | 257 | 27.1 |

Procedure 4

In an alternative procedure, Sandex shaker (Lau) a mixture of PDMS solution in HMDS (15 wt % Korasilon G30M in 85% hexamethyldisiloxane), a micellar block copolymer solution according to example 15 and glass beads (size 2 mm) was dispersed for 2 hours resulting in a storage stable fine emulsion. This emulsion was heated under nitrogen stream until internal temperature was >98° C. and all HMDS was removed. The example and amount of micellar block copolymer solution, glass beads and PDMS solution in HMDS used are provided in table 9.

TABLE 9

| | Compounds | | | Property |
|---|---|---|---|---|
| Example | micellar block copolymer solution (in g) | PDMS solution in HMDS (15 wt % Korasilon G30M in 85% HMDS) (in g) | glass beads (in g) | solid content (in %) |
| 27 | 5 g of example 15 | 7.8 | 13 | 23.4 |

Procedure 5

In another alternative procedure, a Sandex shaker (Lau) a mixture of PDMS solution in Xylene (20 wt % Genioplast Gum in 80% xylene), a micellar block copolymer solution according to example 15 and glass beads (size 2 mm) were dispersed for 2 hours resulting in a storage stable fine emulsion. The example and amount of micellar block copolymer solution, glass beads and PDMS solution in xylene used are provided in table 10.

Table 10

TABLE 10

| | Compounds | | | Property |
|---|---|---|---|---|
| Example | micellar block copolymer solution (in g) | PDMS solution in Xylene (20 wt % Genioplast Gum in 80%) (in g) | glass beads (in g) | solid content (in %) |
| 28 | 10 g of example 15 | 11.7 | 22 | 12.7 |

Particle Size Measurement

Emulsion droplet size was measured by Microtrac particle size measurement for examples 16 to 28 and compared with comparative example DC 51. The results are provided in table 11.

TABLE 11

| Example | Dv 10 (in nm) | Dv 50 (in nm) | Dv 90 (in nm) | PDI (Dv 90 − Dv 10)/Dv 50 |
|---|---|---|---|---|
| DC 51 | 1380 | 2190 | 5690 | 1.96 |
| 16 | 283 | 589 | 2004 | 2.9 |
| 17 | 327 | 625 | 2415 | 3.3 |
| 18 | 247 | 429 | 1110 | 2.0 |
| 19 | 71 | 563 | 2191 | 3.7 |
| 20 | 41 | 224 | 2819 | 12.4 |
| 21 | 31 | 745 | 6010 | 8.0 |
| 22 | 213 | 385 | 748 | 1.39 |
| 26 | 211 | 2089 | 4390 | 2.0 |
| 27 | 820 | 1580 | 3910 | 1.95 |
| 28 | 200 | 320 | 3280 | 9.6 |

The results demonstrate that the composition in form of PDMS emulsion obtained according to the present invention ie. examples 16 to 28 provide narrower particle size distribution when compared with the comparative example DC 51, which leads to better distribution of PDMS in the coating formulations. It is known that larger particles have a negative effect on gloss and haze of coating formulations. Whereas, the inventive examples of the present invention provide better haze and gloss values against comparative example DC 51.

Measurement of Surface Friction, Haze, Gloss, Craters and Blocking Behavior of Coating Formulations A coating formulation was prepared to demonstrate that the composition in form of an aqueous emulsion of PDMS according to the present invention when used as an additive in the coating formulations exhibits better slip and mar resistance demonstrated by low values of dynamic coefficient of friction (CoF), anti-blocking behavior, reduced crater formation and optical properties such as lower haze and high gloss.

1. Measurement of Surface Tension

Coating formulations were prepared by first obtaining a formulation comprising mixture of Joncryl® (226.92 g) and de-mineralized water (23.075 g). Thereafter, additive (composition comprising PDMS emulsion obtained according to the present invention) is added to the coating formulation in various wt.-% to obtain coating formulations with varying amount of additives. The amount of formulation and additives used to prepare the coating formulations are provided in table 12.

TABLE 12

| Coating formulation | Additive (composition in form of a PDMS emulsion according to the present invention) | |
|---|---|---|
| (in g) | (in wt.-%) | (in g) |
| 9.98 | 0.2 | 0.02 |
| 9.95 | 0.5 | 0.05 |
| 9.9 | 1 | 0.1 |
| 9.8 | 2 | 0.2 |
| 9.7 | 3 | 0.3 |
| 9.6 | 4 | 0.4 |
| 9.5 | 5 | 0.5 |

The coating formulations were thereafter defoamed in a Speedmixer Hauschild DAC 400.1 and applied with a wire bar of 60µ on 2 PE-foils. To calculate the coefficient of friction (CoF) the coating formulations were measured after 1 day and 7 days drying with a Ray-Ran test equipment for friction. In this method, a 200-g sled is pulled over the coating surface and the force needed for pulling the sled was measured. The result has been provided in table 13 as dynamic coefficient of friction without a unit. It has been experimentally determined that the best slip needs a value of the 'coefficient of friction' of around 0.2 after both 1 and 7 days.

Table 13 provides CoF for coating formulations comprising varying amounts of the additive (composition in form of a PDMS emulsion according to the present invention) when compared with the CoF of the commercially available product DC 51.

TABLE 13

| | Additive | | | |
|---|---|---|---|---|
| (in wt.-%) | active PDMS (in %) | example | CoF (1 day) | CoF (7 day) |
| | | blank | 0.481 | 0.76 |
| 0.5 | 60 | DC51 | 0.224 | 0.199 |
| 1.0 | 9 | example 19 | 0.250 | 0.276 |
| 2.0 | 9 | example 19 | 0.198 | 0.2 |
| 0.5 | 21 | example 26 | 0.265 | 0.244 |
| 1.0 | 21 | example 26 | 0.202 | 0.191 |
| 1.0 | 20 | example 27 | 0.205 | 0.212 |
| 1.0 | 10 | example 28 | 0.205 | 0.208 |

As is evident from table 13, in case of comparative example DC 51 (with 60% active PDMS) the dynamic coefficient of friction (CoF) value close to 0.2 is obtained with 0.5 wt.-% concentration. Whereas, in the coating formulations comprising the additive (composition in for of PDMS emulsion according to the present invention), for example, in the inventive example 19 (with 9% active PDMS) CoF value close to 0.2 is obtained with 2 wt.-% concentration. Although the amount of additive required to obtain the desired value of 0.2 in case of the present invention is four times of the comparative example but there is a 40% reduction in the amount of active PDMS which is required to obtain the same desired effect. Similarly, when 1 wt.-% of the inventive example 19 is used as an additive for the coating formulation there is a 70% reduction in the amount of active PDMS when compared with DC 51 which is required to obtain the desired result of CoF value close to 0.2.

Further, in the inventive example 26 (with 21% active PDMS) the value for CoF close to 0.2 is obtained with 1 wt.-%. Clearly, when compared with the comparative example DC 51 there is a 30% reduction in the amount of active PDMS which is required to obtain the same desired effect. Similarly, when 0.5 wt.-% of the inventive example 26 is used as an additive for the coating formulation there is a 65% reduction in the amount of active PDMS when compared with DC 51 which is required to obtain the desired result of CoF value close to 0.2.

Further, in the inventive example 27 (with 20% active PDMS) the value for CoF close to 0.2 is obtained with 1 wt.-%. Clearly, when compared with the comparative example DC 51 there is a 33% reduction in the amount of active PDMS which is required to obtain the same desired effect.

Furthermore, in the inventive example 28 (with 10% active PDMS) the desired value for CoF close to 0.2 is obtained with 1 wt.-%. Clearly, when compared with the comparative example DC 51 there is a 66% reduction in the amount of active PDMS which is required to obtain the same desired effect.

Thus, it is clear from the above-mentioned examples that for coating formulations comprising the additive (composition in form of PDMS emulsion obtained according to the present invention) the desired values for CoF of 0.2 is achieved with a much lesser amount of active PDMS as compared to the comparative example DC 51.

2. Measurement of Haze, Gloss and Crater Formation

The value of haze and gloss at 20° over black were measured with the Byk-Gardner Haze-Gloss. The crater behavior is evaluated subjectively by counting the quantity of craters on the surface of the dried coating and classified them on a scale of 1 to 8 in the decreasing order of crater formation.

Table 14 provides the comparison of the crater, haze and gloss results after 1 and 7 days for coating formulations comprising the additive (composition in form of PDMS emulsion obtained according to the present invention) when compared with the commercially available product DC 51.

TABLE 14

| | Additive | | | | | | |
|---|---|---|---|---|---|---|---|
| (in wt %) | Active PDMS (in %) | Example | Craters | Haze 1d | Haze 7d | Gloss 1d | Gloss 7d |
| | | blank | 2 | 112 | 110 | 247 | 248 |
| 1 | 60 | DC51 | 5 | 377 | 370 | 141 | 142 |

TABLE 14-continued

| (in wt %) | Active PDMS (in %) | Example | Craters | Haze 1d | Haze 7d | Gloss 1d | Gloss 7d |
|---|---|---|---|---|---|---|---|
| 1.0 | 53 | Example 16 | 2 | 146 | 144 | 195 | 194 |
| 1.0 | 42 | Example 18 | 2 | 166 | 167 | 198 | 196 |
| 0.2 | 9 | Example 19 | 4 | 133 | 135 | 243 | 243 |
| 0.5 | 9 | Example 19 | 3 | 148 | 149 | 238 | 238 |
| 1 | 9 | Example 19 | 4 | 166 | 166 | 232 | 232 |
| 2 | 9 | Example 19 | 2 | 198 | 202 | 220 | 220 |
| 3 | 9 | Example 19 | 4 | 235 | 236 | 208 | 209 |
| 4 | 9 | Example 19 | 4 | 266 | 263 | 194 | 197 |
| 5 | 9 | Example 19 | 3 | 283 | 285 | 186 | 186 |
| 0.5 | 21 | Example 26 | 3 | 153 | 155 | 233 | 235 |
| 0.1 | 21 | Example 26 | 3 | 189 | 183 | 198 | 216 |

The results of table 14 clearly imply that the inventive examples 16, 18, 19 and 26 show better effect ie. provide lower haze and higher gloss values on active PDMS levels, than the comparative product DC 51.

3. Measurement of Blocking Behavior

Coating formulations were prepared by first obtaining a formulation comprising the following ingredients as mentioned in table 15 by hand mixing according to any order known to a skilled person in the art.

TABLE 15

| Ingredients | wt.- (in g) |
|---|---|
| Acronal ® LR 9014 | 79 |
| AMP 90 | 0.2 |
| Hydropala ®t WE 3221 | 0.2 |
| Defoamer | 0.5 |
| Solvenon ® DPM | 2.5 |
| Tinuvin ® 1130 | 1.0 |
| Rheovis ® PU 1190 | 0.35 |
| Rheovis ® HS 1162 | 0.2 |
| Acemat ® TS 100 | 1.5 |
| De-mineralized water | 13.25 |
| Formulation (total) | 100 |

Thereafter, additive (composition in form of PDMS emulsion obtained according to the present invention) is added to formulation in various wt.-% to obtain coating formulations with varying amounts of additives. The amount of formulation and additives used to prepare the coating formulation samples are provided in table 16.

TABLE 16

| Formulation (mg) | Additive (in wt.-%) | Additive (in g) |
|---|---|---|
| 9.98 | 0.2 | 0.02 |
| 9.95 | 0.5 | 0.05 |
| 9.9 | 1 | 0.1 |
| 9.8 | 2 | 0.2 |
| 9.7 | 3 | 0.3 |

The coating formulation samples are afterwards defoamed in a Speedmixer Hauschild DAC 400.1 and applied on an area of 300 μm, wetted on a leneta carton, dried for 24 hours at 23° C. at 50% relative humidity. Thereafter, 2 cartons were stapled such that the coated area is kept face to face. A weight of 10 kg bring was kept on the contact surface (50 mm×50 mm) and the panels are stored for 24 hours at 50° C. After cooling down to room temperature, the weight was removed and cartons were separated by hand and assessed for blocking. A rating from 0 (excellent) to 3 (bad) was given.

Table 17 provides the blocking behavior of the coating formulations comprising the additive (composition in form of a PDMS emulsion obtained according to the present invention) when compared with the commercially available product DC 51.

TABLE 17

| wt.-% (in g) | additive (active PDMS in %) | example | Blocking behaviour |
|---|---|---|---|
|  |  | blank | 3 |
| 0.2 | 60 | DC 51 | 1.5 |
| 0.5 | 10 | example 28 | 1 |
| 1 | 10 | example 28 | 1 |

The results of table 17 provide that coating compositions comprising the additive (composition in form of PDMS emulsion according to the present invention) provide better anti-blocking properties when compared with the commercially available product DC 51. For example, additive according to example 28 (10% PDMS) shows better blocking at lower total PDMS content than DC51 (60% PDMS) i.e. the active PDMS content to obtain better blocking effect is reduced by 58% and 16% when 0.5 wt.-% and 1 wt.-% of additive (PDMS emulsion according to the present invention), respectively, is added to the coating formulation.

The invention claimed is:

1. A composition in form of an emulsion containing comprising a continuous phase and a dispersed phase comprising:
    a) at least one block copolymer comprising a block A derived from at least one unsaturated monomer selected from the group consisting of (meth)acrylates and a block B derived from at least one unsaturated monomer selected from the group consisting of (meth)acrylic acids, obtained in a controlled radical polymerization process,
    b) at least one non-polymerizable, non-polar silicone oil having at least one poly(dimethylsilyloxy)-group, and
    c) water,
    wherein water is the continuous phase and the at least one non-polymerizable, non-polar silicone oil having at least one poly(dimethylsilyloxy)-group is the dispersed phase in the form of emulsion droplets.

2. The composition according to claim 1, wherein a weight ratio of (meth)acrylate monomer to (meth)acrylic acid monomer is 1:10 to 10:1.

3. The composition according to claim 1, wherein the (meth)acrylate monomer is selected from the group consisting of esters of (meth)acrylic acid with $C_1$-$C_{30}$ alkanols, $C_1$-$C_{20}$ alkyl phenols, $C_5$-$C_{20}$ cycloalkanols, phenyl-$C_1$-$C_4$ alkanols or phenoxy-$C_1$-$C_4$ alkanols.

4. The composition according to claim 1, wherein the (meth)acrylate monomer is selected from the group consisting of esters of (meth)acrylic acid with $C_1$-$C_8$ alkanols.

5. The composition according to claim 1, wherein the controlled radical polymerization is selected from nitroxide-mediated controlled polymerization (NMP), atom transfer radical polymerization (ATRP), or reversible addition fragmentation chain transfer polymerization (RAFT).

6. The composition according to claim 5, wherein the nitroxide-mediated controlled polymerization is carried out by using a polymerization regulator compound which is selected from one of the following formulae (A), (B) and (C) or based on the corresponding stable free nitroxyl radicals in conjunction with a radical source:

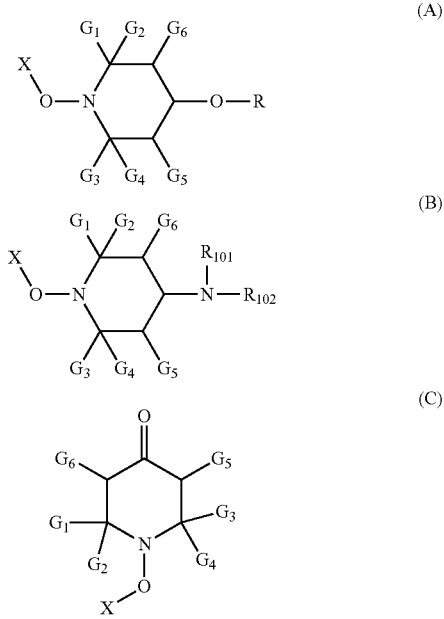

wherein

R is hydrogen, $C_1$-$C_{18}$ alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_1$-$C_{12}$ alkyl, $C_5$-$C_7$ cycloalkyl, $C_7$-$C_8$aralkyl, $C_2$-$C_{18}$ alkanoyl, $C_3$-$C_5$ alkenoyl or benzoyl;

$R_{102}$ is $C_1$-$C_{18}$ alkyl, $C_5$-$C_7$ cycloalkyl, $C_2$-$C_8$ alkenyl, which can be unsubstituted or substituted by a cyano, carbonyl or carbamide group, or is glycidyl, a group of the formula —$CH_2CH(OH)$—Z or of the formula —CO—Z or —CONH—Z, wherein Z is hydrogen, methyl or phenyl;

$G_6$ is hydrogen;
$G_5$ is hydrogen or $C_1$-$C_4$;
$G_1$ and $G_3$ are methyl;
$G_2$ and $G_4$ are ethyl or propyl, or $G_1$ and $G_2$ are methyl and $G_3$ and $G_4$ are ethyl or propyl; and X is selected from $CH_2$-phenyl, $CH_3CH$-phenyl, $(CH_3)_2$C-phenyl, $(C_5$-$C_6$ cycloalkyl$)_2$CCN, $(CH_3)_2$CCN,

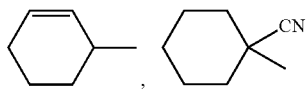

$CH_2CH\!=\!CH_2$, $CH_3CH\!-\!CH\!=\!CH_2$, $(C_1$-$C_4$alkyl) $CR_{20}$—C(O)-phenyl, $(C_1$-$C_4)$alkyl-$CR_{20}$—C(O)—$(C_1$-$C_4)$alkoxy, $(C_1$-$C_4)$alkyl-$CR_{20}$—C(O)—$(C_1$-$C_4)$alkyl, $(C_1$-$C_4)$alkyl-$CR_{20}$—C(O)—N-di$(C_1$-$C_4)$alkyl, $(C_1$-$C_4)$alkyl-$CR_{20}$—C(O)—NH$(C_1$-$C_4)$alkyl, $(C_1$-$C_4)$alkyl-$CR_{20}$—C(O)—$NH_2$, wherein $R_{20}$ is hydrogen or $(C_1$-$C_4$ alkyl); and wherein any of the alkyl groups can be unsubstituted or substituted by one or more functional groups selected from the group consisting of hydroxyl, amino, carboxylic acid, halide, cyano, and carbonyl.

7. The composition according to claim 1, wherein the at least one non-polymerizable, non-polar silicone oil having at least one poly(dimethylsilyloxy)-group has a viscosity in the range from ≥0.1 $m^2$/sec to ≤30000 $m^2$/sec at a temperature of 20° C., according to DIN 53019.

8. The composition according to claim 1, wherein the at least one non-polymerizable, non-polar silicone oil having at least one poly(dimethylsilyloxy)-group has a viscosity in the range from ≥1000 $m^2$/sec to ≤30000 $m^2$/sec at a temperature of 20° C., according to DIN 53019.

9. The composition according to claim 1, wherein the at least one non-polymerizable, non-polar silicone oil having at least one poly(dimethylsilyloxy)-group is a polydimethylsiloxane comprising at least 90% by weight of dimethylsilyloxy groups, based on total weight of the non-polymerizable, non-polar silicone oil.

10. The composition according to claim 1, wherein the emulsion droplets have an average size $Dv_{50}$ in the range from ≥10 nm to ≤10000 nm determined according to dynamic light scattering technique with a fixed scattering angle of 90° or 180°.

11. The composition according to claim 1, wherein the emulsion comprises a micelle having an average size $Dv_{50}$ in the range from ≥10 nm to ≤100 nm determined according to dynamic light scattering technique with a fixed scattering angle of 90° or 180°.

12. The composition according to claim 1, wherein the at least one block copolymer has a polydispersity index (PDI) in the range from ≥1.1 to ≤1.8 determined according to gel permeation chromatography with polystyrene standards.

13. The composition according to claim 1, wherein the composition comprises:
a) at least one block copolymer comprising a block A derived from at least one unsaturated monomer selected from the group consisting of esters of (meth)acrylic acid with $C_1$-$C_{30}$ alkanols, $C_1$-$C_{20}$ alkyl phenols, $C_5$-$C_{20}$ cycloalkanols, phenyl-$C_1$-$C_4$ alkanols or phenoxy-$C_1$-$C_4$ alkanols and a block B derived from at least one unsaturated monomer selected from the group consisting of (meth)acrylic acids, obtained in a controlled radical polymerization process,
b) at least one non-polymerizable, non-polar silicone oil having at least one poly(dimethylsilyloxy)-group having a viscosity in the range from ≥0.1 $m^2$/sec to ≤30000 $m^2$/sec, at a temperature of 20° C., according to DIN 53019, and
c) water,
wherein water is the continuous phase and the at least one non-polymerizable, non-polar silicone oil having at least one poly(dimethylsilyloxy)-group is the dispersed phase in the form of emulsion droplets having an average size $Dv_{50}$ in the range from ≥10 nm to ≤10000 nm determined according to dynamic light scattering technique with a fixed scattering angle of 90° or 180°.

14. The composition according to claim 1, wherein an amount of the at least one block copolymer is in the range from ≥0.1 wt-% to ≤10 wt.-% by weight, based upon the total weight of the composition, an amount of the at least one non-polymerizable, non-polar silicone oil having at least one poly(dimethylsilyloxy)-group is in the range from ≥0.1 wt.-% to ≤70 wt.-% by weight, based upon the total weight of the composition, and an amount of water is in the range from ≥20 wt.-% to ≤98.8 wt.-% by weight, based upon the total weight of the composition.

15. The composition according to claim 1, wherein the composition comprises:
   a) ≥0.1 wt.-% to ≤10 wt.-% by weight of at least one block copolymer comprising a block A derived from at least one unsaturated monomer selected from the group consisting of esters of (meth)acrylic acid with $C_1$-$C_{30}$ alkanols and a block B derived from (meth)acrylic acid, obtained in a controlled radical polymerization process,
   b) ≥0.1 wt.-% to ≤70 wt.-% by weight of at least one non-polymerizable, non-polar silicone oil having at least one poly(dimethylsilyloxy)-group having a viscosity in the range from ≥1000 m²/sec to ≤30000 m²/sec, at a temperature of 20° C., according to DIN 53019, and
   c) ≥20 wt.-% to ≤98.8 wt.-% by weight water,
   wherein the wt.-% are based upon total weight of the composition, and
   wherein water is the continuous phase and the at least one non-polymerizable, non-polar silicone oil having at least one poly(dimethylsilyloxy)-group is the dispersed phase in the form of emulsion droplets having an average size $Dv_{50}$ in the range from ≥10 nm to ≤10000 nm determined according to dynamic light scattering technique with a fixed scattering angle of 90° or 180°.

16. The composition according to claim 1, wherein the composition comprises:
   a) ≥0.1 wt.-% to ≤10 wt.-% by weight of at least one block copolymer comprising a block A derived from at least one unsaturated monomer selected from the group consisting of esters of (meth)acrylic acid with $C_1$-$C_3$ alkanols and a block B derived from at least one unsaturated monomer selected from the group consisting of (meth)acrylic acids, obtained in a controlled radical polymerization,
   b) ≥0.1 wt-% to ≤70 wt-% by weight of at least one non-polymerizable, non-polar silicone oil having at least one poly(dimethylsilyloxy)-group having a viscosity in the range from ≥1000 m²/sec to ≤30000 m²/sec, at a temperature of 20° C., according to DIN 53019, and
   c) ≥20 wt.-% to ≤98.8 wt.-% by weight water,
   wherein the wt.-% are based upon total weight of the composition, and
   wherein water is the continuous phase and the at least one non-polymerizable, non-polar silicone oil having at least one poly(dimethylsilyloxy)-group is the dispersed phase, whereby the at least one non-polymerizable, non-polar silicone oil having at least one poly(dimethylsilyloxy)-group comprises at least 90% by weight of dimethylsilyloxy groups, based on total weight of the non-polymerizable, non-polar silicone oil, is in the form of emulsion droplets having an average size $Dv_{50}$ in the range from ≥10 nm to ≤10000 nm determined according to dynamic light scattering technique with a fixed scattering angle of 90° or 180°.

17. The composition according to claim 1, wherein the composition comprises:
   a) ≥0.1 wt.-% to ≤10 wt.-% by weight of at least one block copolymer comprising a block A derived from n-butyl acrylate and a block B derived from (meth)acrylic acid, obtained in a controlled radical polymerization process,
   b) ≥0.1 wt.-% to ≤70 wt.-% by weight of at least one non-polymerizable, non-polar silicone oil having at least one poly(dimethylsilyloxy)-group having a viscosity in the range from ≥1000 m²/sec to ≤30000 m²/sec, at a temperature of 20° C., according to DIN 53019, and
   c) ≥20 wt.-% to ≤98.8 wt.-% by weight water,
   wherein the wt.-% are based upon total weight of the composition, and
   wherein water is the continuous phase and the at least one non-polymerizable, non-polar silicone oil having at least one poly(dimethylsilyloxy)-group is the dispersed phase, whereby the at least one non-polymerizable, non-polar silicone oil having at least one poly(dimethylsilyloxy)-group comprises at least 90% by weight of dimethylsilyloxy groups, based on total weight of the non-polymerizable, non-polar silicone oil, is in the form of emulsion droplets having an average size $Dv_{50}$ in the range from ≥10 nm to ≤10000 nm determined according to dynamic light scattering technique with a fixed scattering angle of 90° or 180°.

18. The composition according to claim 1, wherein a weight ratio of the at least one non-polymerizable non-polar silicone oil having at least one poly(dimethylsilyloxy)-group to the at least one block copolymer is in the range from ≥1:100 to ≤100:1.

19. The composition according to claim 1, wherein a weight ratio of the at least one non-polymerizable non-polar silicone oil having at least one poly(dimethylsilyloxy)-group to the at least one block copolymer is in the range from ≥1:20 to ≤20:1.

20. The composition according to claim 1, wherein a solid content in the emulsion is in the range from ≥10% to ≤75%.

21. A process for preparing the composition according to claim 1, comprising:
   i) preparing a block copolymer solution by controlled radical polymerization by reacting at least one unsaturated monomer selected from the group consisting of (meth)acrylates and reacting (meth)acrylic acid;
   ii) mixing the block copolymer solution obtained in step i) in water and adding non-polymerizable, non-polar silicone oil having at least one poly(dimethylsilyloxy)-group to obtain a pre-emulsion; and
   iii) homogenizing the pre-emulsion obtained in step ii) to obtain the composition in form of an emulsion having emulsion droplets of an average size $Dv_{50}$ in the range from ≥100 nm to ≤10000 nm determined according to dynamic light scattering technique with a fixed scattering angle of 90° or 180°.

22. The process according to claim 21, comprising neutralizing the block copolymer solution of i) by reacting with a compound selected from the group consisting of an alkyl alkanolamine, alkali metal hydroxide, alkali metal carbonate, alkali metal hydrogen carbonate and ammonia.

23. The process according to claim 21, comprising adding a solvent to dissolve silicone oil to obtain a silicon solution.

24. The process according to claim 23, comprising removing the solvent.

25. The process according to claim 23, wherein the solvent is selected from the group consisting of toluene, xylene, hexamethyldisiloxane, D4, naptha, cyclohexane, n-hexane, n-heptane, diisopropyl ether, hexyl ether, ethyl acetate, butyl acetate, isopropyl laurate, isopropyl palmitate, isopropyl myristate, methyl ethyl ketone, methyl isobutyl ketone, lauryl alcohol, trichloroethylene, perchloroethylene and methylene chloride.

26. The process according to claim 25, wherein the solvent is selected from the group consisting of toluene, xylene, and hexamethyldisiloxane.

27. A process, comprising employing the composition according to claim 1 as an additive in polymer based aqueous coating compositions, printing ink compositions, personal care products, textiles, leather and indirect food contact applications.

28. The process according to claim 27, wherein the process provides at least one of the following effects:
   reduction of the static or dynamic coefficient of friction of the coating or ink,
   increasing the anti-blocking properties of the coating, ink or in food contact applications,
   increasing stain resistance of the coating or ink,
   imparting anti-graffiti properties to the coating or ink,
   imparting hydrophobic properties or water repellence to the coating or ink,
   smoothening effect in personal care products, and
   finishing effect in textiles and leather.

29. An aqueous composition in the form of a coating composition or printing ink composition or personal care product composition comprising:
   $\geq 0.01\%$ wt.- to $\leq 10\%$ wt.-by weight, based on the total weight of the aqueous composition, the composition in form of emulsion according to claim 1; and
   additionally, pigments, fillers, binders, solvents, defoamers, pigment dispersing agents, rheology modifiers, wetting agents, neutralizers, organically modified poly siloxanes, UV absorbers, matting agents, pigment, synergists and preservatives, whereby the sum of the weight percentages of the components adds up to 100% by weight.

30. An aqueous composition in the form of a coating composition or printing ink composition or personal care product composition, comprising:
   $\geq 0.1\%$ wt.- to $\leq 5\%$ wt.-% by weight, based on the total weight of the aqueous composition, the composition in form of emulsion according to claim 1; and
   additionally pigments, fillers, binders, solvents, defoamers, pigment dispersing agents, rheology modifiers, wetting agents, neutralizers, organically modified polysiloxanes, UV absorbers, matting agents, pigment, synergists and preservatives, whereby the sum of weight percentages of components adds up to 100% by weight.

31. An aqueous composition in the form of a coating composition or printing ink composition or personal care product composition, comprising:
   $\geq 0.1\%$ wt.- to $\leq 3\%$ wt.-by weight, based on the total weight of the aqueous composition, the composition in form of emulsion according to claim 1; and
   additionally, pigments, fillers, binders, solvents, defoamers, pigment dispersing agents, rheology modifiers, wetting agents, neutralizers, organically modified poly siloxanes, UV absorbers, matting agents, pigment, synergists and preservatives, whereby the sum of weight percentages of components adds up to 100% by weight.

32. A composition in form of an emulsion comprising a continuous phase and a dispersed phase consisting of:
   a) at least one block copolymer comprising a block A derived from at least one unsaturated monomer selected from the group consisting of (meth)acrylates and a block B derived from at least one unsaturated monomer selected from the group consisting of (meth)acrylic acids, obtained in a controlled radical polymerization process,
   b) at least one non-polymerizable, non-polar silicone oil having at least one poly(dimethylsilyloxy)-group, and
   c) water,
   wherein water is the continuous phase and the at least one non-polymerizable, non-polar silicone oil having at least one poly(dimethylsilyloxy)-group is the dispersed phase in the form of emulsion droplets.

* * * * *